United States Patent
Yoshida et al.

(10) Patent No.: US 7,213,028 B2
(45) Date of Patent: May 1, 2007

(54) RECORDING APPARATUS, FILE MANAGEMENT METHOD, PROGRAM FOR FILE MANAGEMENT METHOD, AND RECORDING MEDIUM HAVING PROGRAM FOR FILE MANAGEMENT METHOD RECORDED THEREON

(75) Inventors: Haruo Yoshida, Kanagawa (JP); Masaharu Murakami, Tokyo (JP); Hiroshi Jinno, Tokyo (JP); Mitsuhiro Hirabayashi, Tokyo (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 10/786,849

(22) Filed: Feb. 25, 2004

(65) Prior Publication Data

US 2004/0225684 A1 Nov. 11, 2004

(30) Foreign Application Priority Data

Feb. 27, 2003 (JP) ............................. 2003-050971

(51) Int. Cl.
*G06F 17/00* (2006.01)

(52) U.S. Cl. .................... 707/102; 707/101; 707/104.1; 707/3; 707/103

(58) Field of Classification Search .................... None
See application file for complete search history.

(56) References Cited

U.S. PATENT DOCUMENTS

2005/0210009 A1* 9/2005 Tran .............................. 707/3
2006/0259512 A1* 11/2006 Jinno et al. .............. 707/104.1

* cited by examiner

*Primary Examiner*—Sana Al-Hashemi
(74) *Attorney, Agent, or Firm*—Frommer Lawrence & Haug LLP; William S. Frommer

(57) ABSTRACT

A recording apparatus such as an optical disk and a file management method are disclosed by which, where an index file is formed from groups of data wherein extract information is collected for different types and one of the groups of data is used to collectively manage the other groups of data, a process relating to deletion or addition of extract information can be executed simply, easily, and with certainty. In each of slots of a property entry, information representing whether the slot is valid or invalid and information representative of a relationship to different slots to which extract information relating to the same file is allocated are recorded, and a combination of the slots in which the extract information of the one file is allocated is managed with the property entry.

8 Claims, 18 Drawing Sheets

FIG. 2

| ENTRY NUMBER |
|---|
| IDENTIFICATION INFORMATION |
| VALID/INVALID FLAG |
| EXTENSION SLOT NUMBER |
| TEXT PRESENCE/ABSENCE FLAG |
| TEXT SLOT NUMBER |
| TEXT EXTENSION FLAG |
| THUMBNAIL PRESENCE/ABSENCE FLAG |
| THUMBNAIL SLOT NUMBER |
| THUMBNAIL EXTENSION FLAG |
| SOUND PRESENCE/ABSENCE FLAG |
| SOUND SLOT NUMBER |
| SOUND EXTENSION FLAG |
| OTHER ATTRIBUTE INFORMATION, MANAGEMENT INFORMATION |

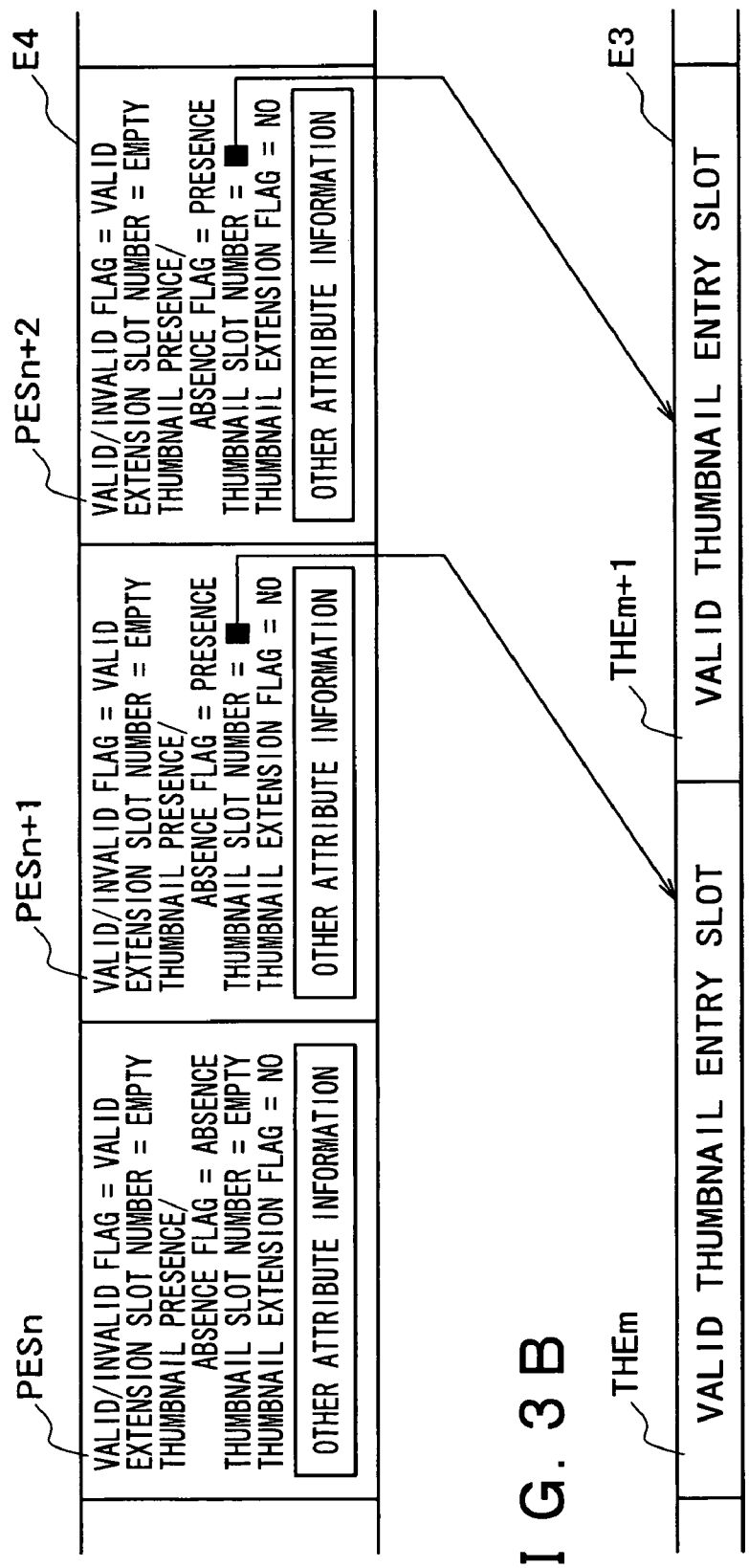

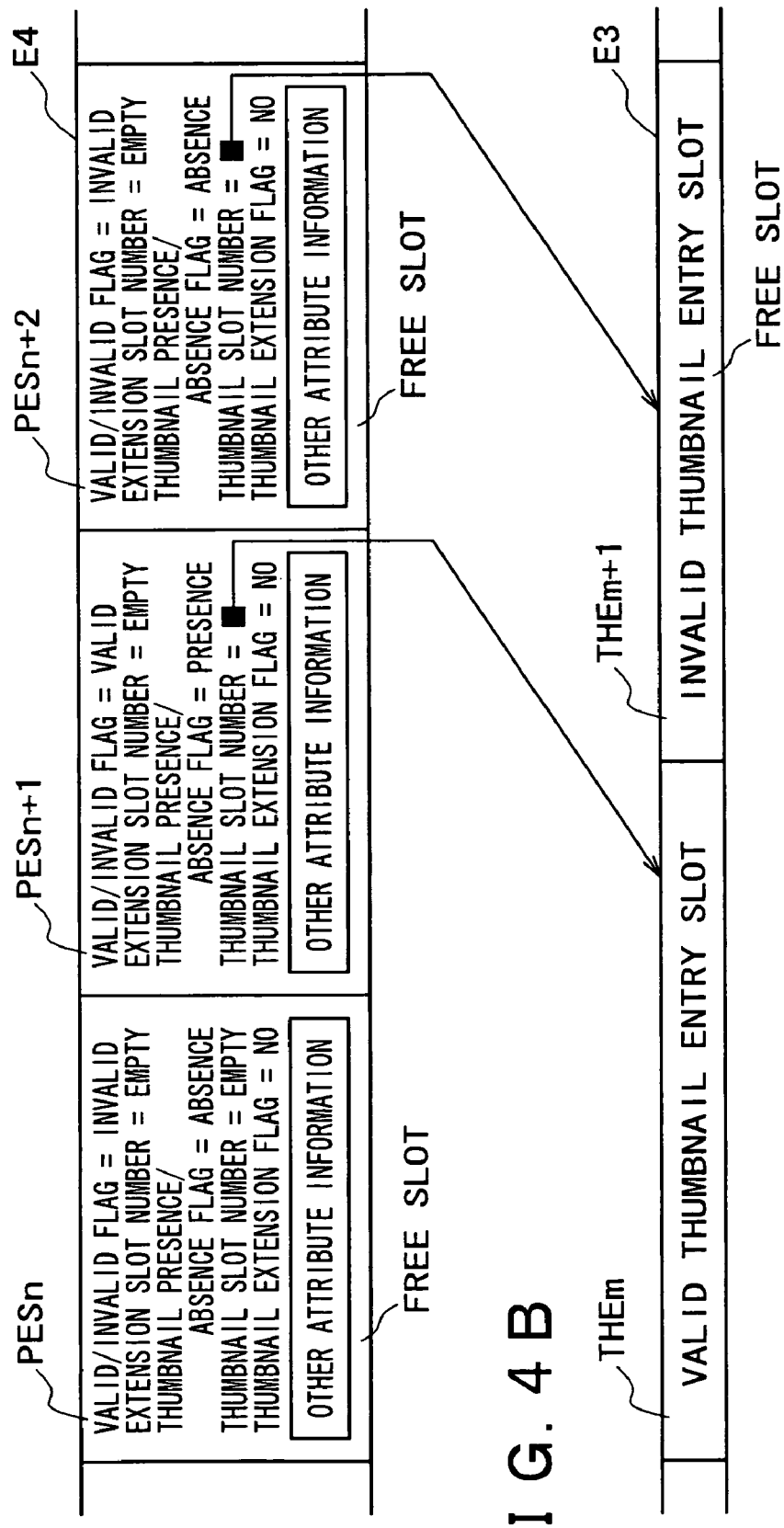

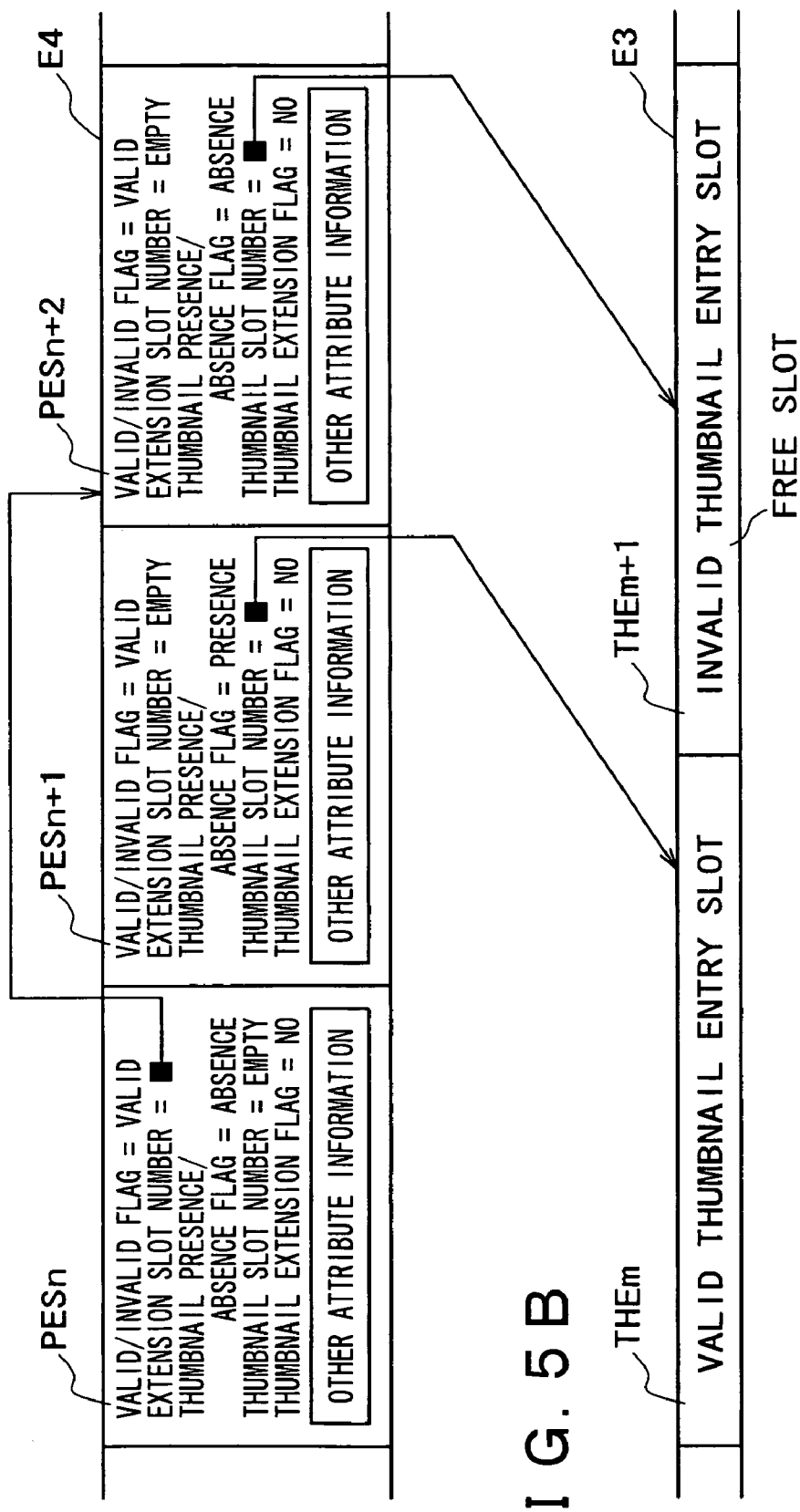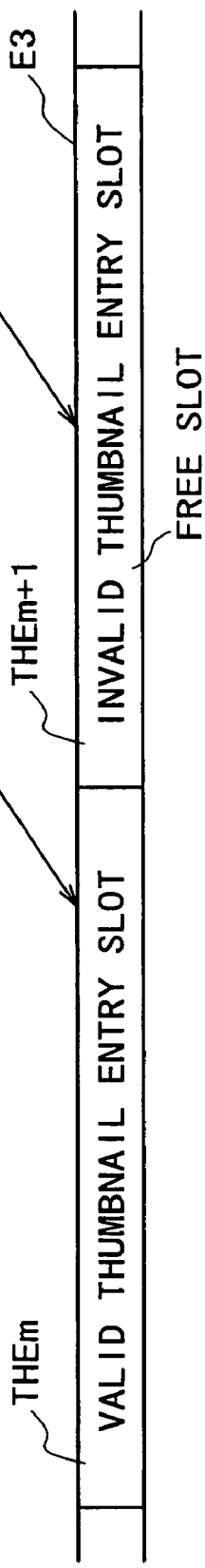
FIG. 5A
FIG. 5B

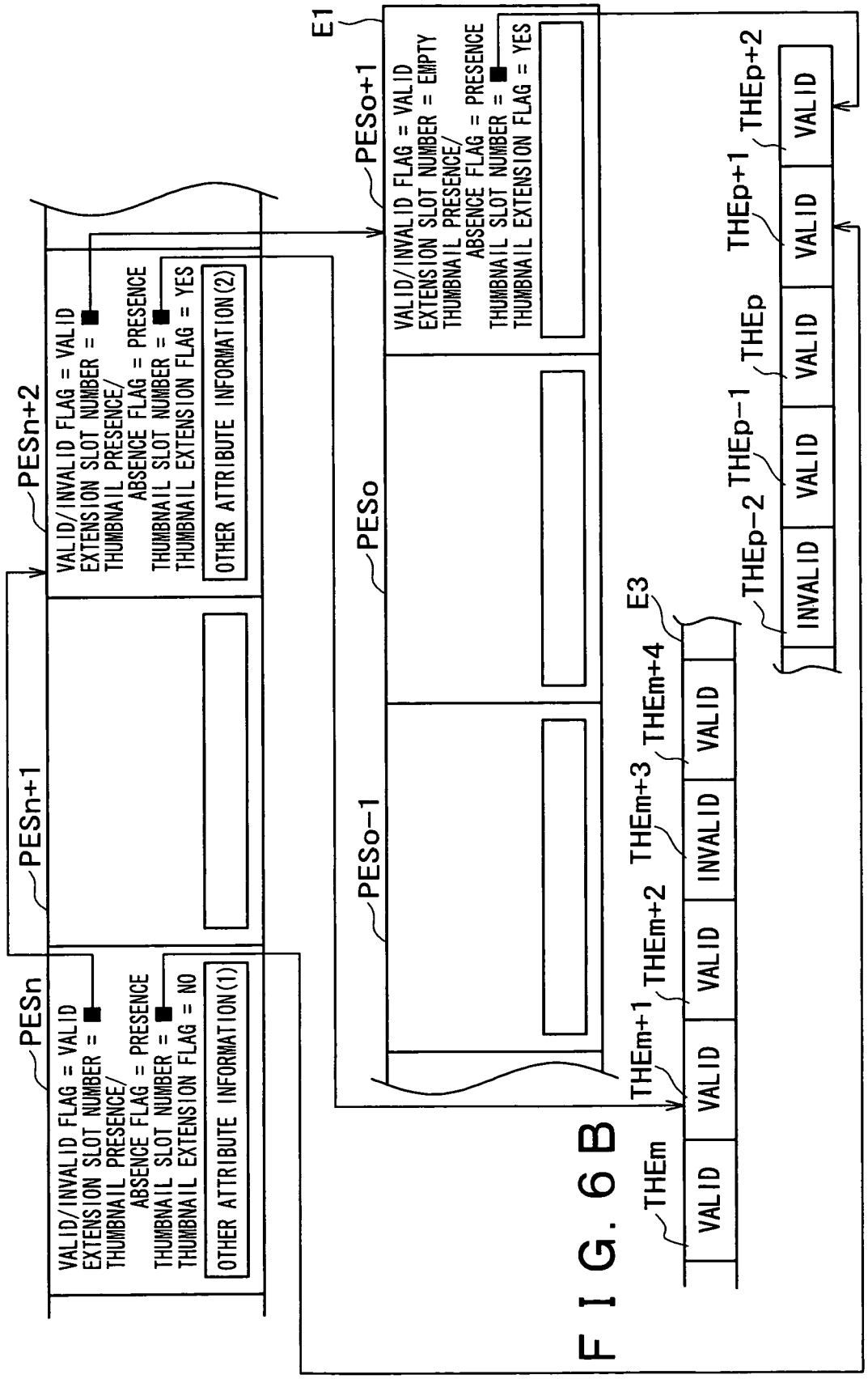

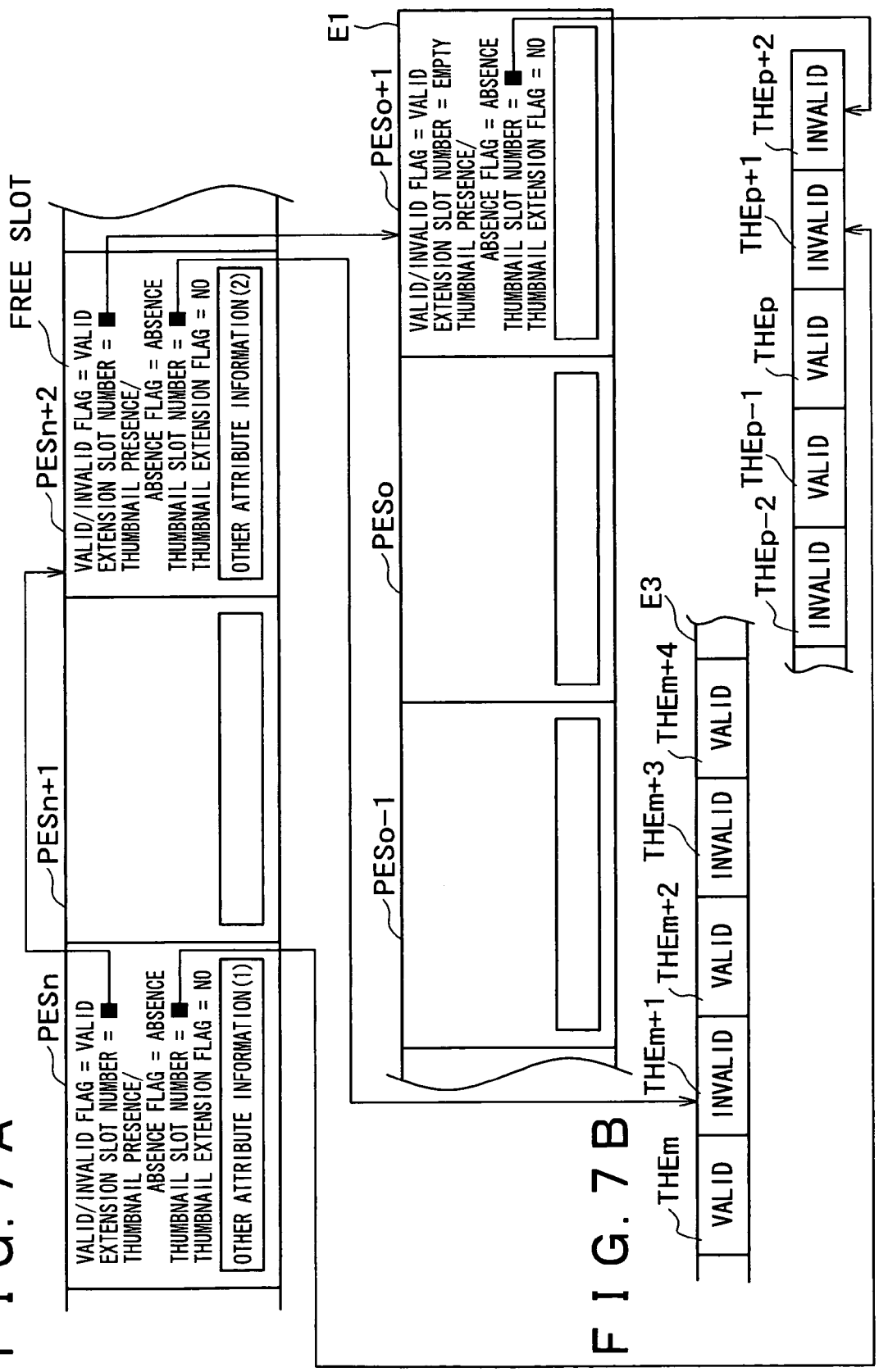

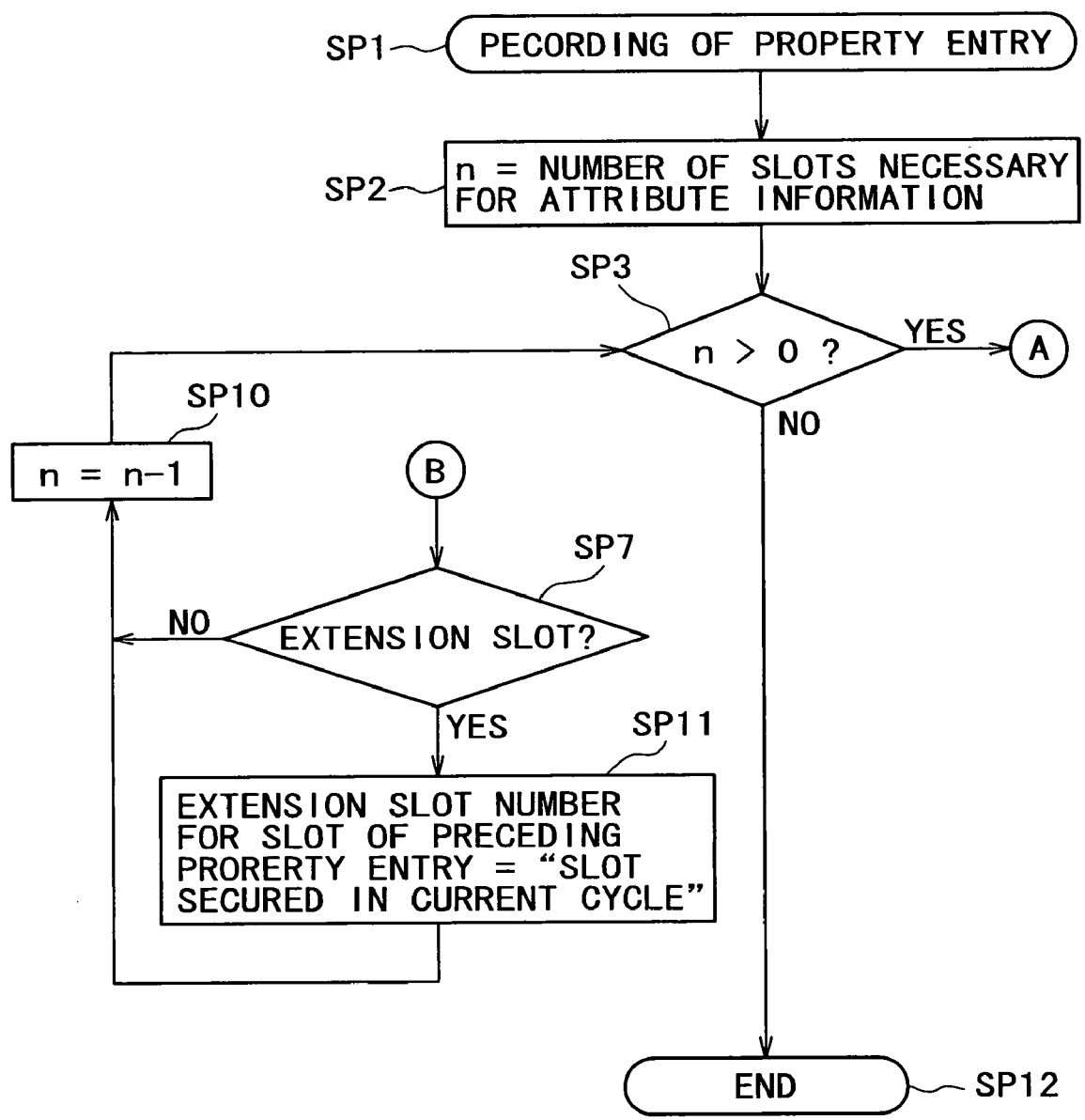

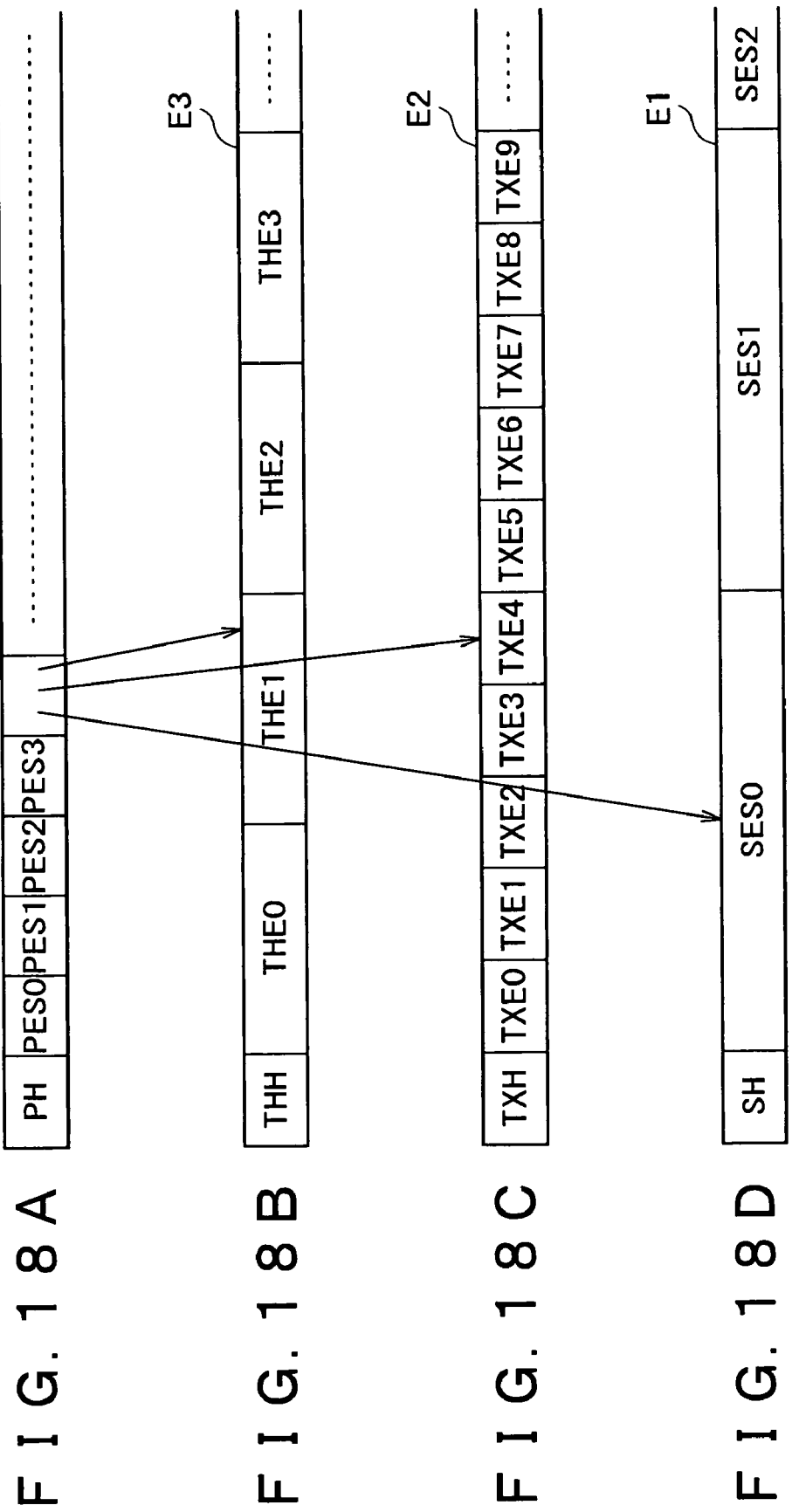

RECORDING APPARATUS, FILE MANAGEMENT METHOD, PROGRAM FOR FILE MANAGEMENT METHOD, AND RECORDING MEDIUM HAVING PROGRAM FOR FILE MANAGEMENT METHOD RECORDED THEREON

BACKGROUND OF THE INVENTION

This invention relates to a recording apparatus, a file management method, a program for a file management method, and a recording medium having a program for a file management method recorded thereon and can be applied typically to an optical disk apparatus.

In recent years, disk apparatus and the like have been proposed, which use a randomly accessible recording medium having a large capacity such as an optical disk to record an image pickup result.

A method is disclosed, for example, in Japanese Patent Laid-open No. 2001-84705 (hereinafter referred to as Patent Document 1), which uses such a disk apparatus as described above to improve the operability in operation of a large number of files. According to the method of the Patent Document 1, an index file for indexing a large number of files recorded on a recording medium is produced from the large number of files and recorded on the recording medium. The large number of files on the recording medium can be operated using the index file.

Japanese Patent Laid-open No. 2002-278996 (hereinafter referred to as Patent Document 2) discloses a method, which further improves the operability in operation of a large number of files recorded on a recording medium. According to the method of the Patent Document 2, an index file produced in such a manner as described above manages the files hierarchically.

In the methods described above, an index file is composed of a part of actual data, which collectively includes extract information formed by extracting information relating to a management object file and so forth and another part of management data, which collectively includes position information and so forth necessary for accessing to the actual data.

Referring to FIGS. 18A to 18D, the actual data part is composed of a sound entry E1, a text entry E2, a thumbnail picture entry E3, and a property entry E4, which are data sets collectively including extract information classified for individual types into groups. The sound entry E1 has allocated thereto a disk title and extract information of audio data for a short period of time representative of contents of management object files. The sound entry E1 includes a sound entry header SH set at the top thereof and representing that the entry is the sound entry E1 and a sequence of sound entry slots SES0, SES1, SES2, . . . each including extract information collected as a block.

The text entry E2 has allocated thereto the disk title and extract information of a character sequence of management object files. The text entry E2 includes a text entry header TXH set at the top thereof and representing that the entry is the text entry E2 and a sequence of text entry slots TXES0, TXES1, TXES2, . . . each including extract information collected as a block.

The thumbnail picture entry E3 has allocated thereto the disk title and extract information of still pictures representative of contents of the management object files. The thumbnail picture entry E3 includes a thumbnail picture entry header THH set at the top thereof and representing that the entry is the thumbnail picture entry E3 and a sequence of thumbnail picture entry slots THES0, THES1, THES2, . . . each including extract information collected as a block.

In contrast, the property entry E4 has allocated thereto the disk title and data representative of properties of the management object files and has allocated thereto extract information of binary data, which are set to the management object files. The property entry E4 includes a property entry header PH set at the top thereof and representing that the entry is the property entry E4 and a sequence of property entry slots PES0, PES1, PES2, . . . each including extract information collected as a block.

Consequently, for example, when a desired file is to be selected with reference to thumbnail pictures, when a file is to be selected based on titles, or in some other case, the index file can provide extract information set to a corresponding one of the entries E1 to E4 to the user in accordance with a selection criterion of the user so that the user can select a desired file simply, easily, and with certainty.

Incidentally, it is expected that, if the slots SES0, . . . , TXES0, . . . , THES0, . . . , and PES0, . . . of the sound entry E1, text entry E2, thumbnail picture entry E3, and property entry E4 of the index file having such a configuration as described above are formed with a fixed length, then it is possible to eliminate wasteful use of a recording medium when recording/deletion onto/from the recording medium are repeated and prevent a drop of the processing speed effectively.

Where the slots SES0, . . . , TXES0, . . . , THES0, . . . , and PES0, . . . are formed with a fixed length in this manner, depending upon a file of a management object, extract information obtained from the single file is allocated to and managed with a plurality of slots. Accordingly, it is necessary to manage a relationship between the slots.

Further, since the extract information is information obtained by extraction from the management object file, depending upon the type of the management object file, also such a situation possibly occurs that, although a corresponding slot is present in the property entry E4, no corresponding slot is present in some other entry or entries. Consequently, also it is possible to manage a relationship between the property entry E4 and the other entries E1 to E3.

Thus, it is expected that, if management information representative of relationships of the property entry E4 with the other entries is recorded in the property entry E4 and other slots recorded in the other entries E1 to E3 are referred to in accordance with the management information as indicated by arrow marks in FIGS. 18A to 18D, then the management of the extract information can be simplified.

On the other hand, where files recorded on a recording medium are managed with such an index file as described above, it is necessary to update the index file when a management object file or files are deleted or added. In this instance, if a corresponding slot or slots are not deleted or added actually but are set as free or empty slots and then the free or empty slots set in this manner are re-utilized, then useless use of regions on the recording medium can be reduced.

It is a possible idea to provide, in such setting of free slots and management of free slots for re-utilization as just described, a space bit map for management of free slots in each of the entries E1 to E4 and further set a link list, which is a list of information indicative of succeeding free slots.

However, where free slots are managed for each entry in this manner, there is a problem that, when the records of the four entries are brought out of matching with each other because of an a bend such as a result of a drop of the power supply before the index file is rewritten completely, a process for restoring the matching is complicated. Further, increased time is required for processing of the index file upon such deletion or addition of a file or files as described above, and this gives rise to a problem that increased processing time is required for a recording apparatus, which involves comparatively long access time such as an optical disk apparatus.

Thus, it is expected that, if such free slots as described above are managed collectively using the property entry, then such problems as described above can be eliminated. Therefore, it is demanded in collective management with the property entry to cope with deletion and addition of extract information by deletion, addition and so forth of a file or files.

SUMMARY OF THE INVENTION

It is an object of the present invention to provide a recording apparatus, a file management method, a program for a file management method, and a recording medium having a program for a file management method recorded thereon by which, where an index file is formed from groups of data wherein extract information is collected for different types and one of the groups of data is used to collectively manage the other groups of data, a process relating to deletion or addition of extract information can be executed simply, easily, and with certainty.

In order to attain the object described above, according to the present invention, a slot of property has recorded therein information representing whether the slot is valid or invalid and information representative of a relationship to another slot to which extract information relating to the same file is allocated, and a combination of slots in which the extract information of the one file is allocated is managed with a property entry and besides a free slot is re-utilized based on the combination of slots to form an index file from groups of data wherein the extract information is collected for the individual types thereof. Thus, where one of the data groups is used to collectively manage the other data groups, a process relating to deletion or addition of extract information can be executed simply, easily, and with certainty.

In particular, according to an aspect of the present invention, there is provided a recording apparatus for recording desired files on a recording medium including index file production means for producing an index files of the file recorded on the recording medium from extract information of the files and a folder, the index file production means being operable to classify the extract information for individual types of the extract information into groups including a group of property to which property information of the files is allocated and a different group different from the group of property, to allocate, in the different group of the extract information, the extract information of one of the files or the folder to one or a plurality of slots of a fixed length, and to allocate, in the group of property, the extract information of the one file or the folder to one or a plurality of slots of the fixed length so that the group of property has at least slots corresponding to the slots of the different group to produce the index file. The index file production means sets, in the slots of the group of property, management information for managing the groups. The index file production means sets, in the management information of each of the slots of the group of property, valid/invalid information representative of whether the slot is valid or invalid, an extension slot number pointing to an extension slot succeeding the slot, presence/absence information representative of whether a corresponding slot of the different group to which the extract information of the file relating to the slot is allocated is present or absent, a slot number pointing to the corresponding slot of the different group, and extension information representative of whether or not the corresponding slot of the different group is an extension slot. A combination of the slots to which the extract information of the one file or the folder is allocated with the extension slot number, presence/absence information, slot number, and extension information being indicated by the group of property.

In the recording apparatus, the index file production means produces an index file of files recorded on a recording medium from extract information of the files and a folder. The index file production means classifies the extract information for individual types of the extract information into groups including a group of property to which property information of the files is allocated and a different group different from the group of property. Further, the index file production means allocates, in the different group of the extract information, the extract information of one of the files or the folder to one or a plurality of slots of a fixed length. The index file production means further allocates, in the group of property, the extract information of the one file or the folder to one or a plurality of slots of the fixed length so that the group of property has at least slots corresponding to the slots of the different group to produce the index file. Furthermore, the index file production means sets, in the slots of the group of property, management information for managing the groups. The index file production means further sets, in the management information of each of the slots of the group of property, valid/invalid information representative of whether the slot is valid or invalid, an extension slot number pointing to an extension slot succeeding the slot, presence/absence information representative of whether a corresponding slot of the different group to which the extract information of the file relating to the slot is allocated is present or absent, a slot number pointing to the corresponding slot of the different group, and extension information representative of whether or not the corresponding slot of the different group is an extension slot. A combination of the slots to which the extract information of the one file or the folder is allocated with the extension slot number, presence/absence information, slot number, and extension information is indicated by the group of property. Consequently, even where extract information corresponding to a file is allocated to a plurality of slots of a fixed length in one group and the number of slots to be used for registration of extract information of one file or folder varies in various manners, the combination of slots to which the extract information of the one file or folder is allocated can be grasped simply, easily, and with certainty only with the property entry. Consequently, processing relating to deletion and addition of extract information can be executed simply, easily, and with certainty with reference to the valid/invalid information and so forth set in the property entry.

According to another aspect of the present invention, there is provided a file management method for managing a plurality of files stored in a predetermined region including the steps of classifying extract information of the files and a folder for individual types of the extract information into groups including a group of property to which property information of the files is allocated and a different group different from the group of property, allocating, in the different group of the extract information, the extract information of one of the files or the folder to one or a plurality of slots of a fixed length, and allocating, in the group of property, the extract information of the one file or the folder to one or a plurality of slots of the fixed length so that the group of property has at least slots corresponding to the slots of the different group to produce an index file. The slots of the group of property have set therein management information for managing the groups being set. The management information of each of the slots of the group of property has set therein valid/invalid information representative of whether the slot is valid or invalid, an extension slot number pointing to an extension slot succeeding the slot, presence/absence information representative of whether a corresponding slot of the different group to which the extract information of the file relating to the slot is allocated is present or absent, a slot number pointing to the corresponding slot of the different group, and extension information representative of whether or not the corresponding slot of the different group is an extension slot. A combination of the slots to which the extract information of the one file or the folder is allocated with the extension slot number, presence/absence information, slot number, and extension information being indicated by the group of property.

According to a further aspect of the present invention, there is provided a program for a file management method for causing a computer to execute a predetermined procedure to manage a plurality of files stored in a predetermined region. The processing procedure includes the steps of classifying extract information of the files and a folder for individual types of the extract information into groups including a group of property to which property information of the files is allocated and a different group different from the group of property, allocating, in the different group of the extract information, the extract information of one of the files or the folder to one or a plurality of slots of a fixed length, and allocating, in the group of property, the extract information of the one file or the folder to one or a plurality of slots of the fixed length so that the group of property has at least slots corresponding to the slots of the different group to produce an index file. The slots of the group of property have set therein management information for managing the groups being set. The management information of each of the slots of the group of property has set therein valid/invalid information representative of whether the slot is valid or invalid, an extension slot number pointing to an extension slot succeeding the slot, presence/absence information representative of whether a corresponding slot of the different group to which the extract information of the file relating to the slot is allocated is present or absent, a slot number pointing to the corresponding slot of the different group, and extension information representative of whether or not the corresponding slot of the different group is an extension slot, a combination of the slots to which the extract information of the one file or the folder is allocated with the extension slot number, presence/absence information, slot number, and extension information being indicated by the group of property.

According to a still further aspect of the present invention, there is provided a recording medium on which a program for a file management method for causing a computer to execute a predetermined procedure to manage a plurality of files stored in a predetermined region is recorded. The processing procedure includes the steps of classifying extract information of the files and a folder for individual types of the extract information into groups including a group of property to which property information of the files is allocated and a different group different from the group of property, allocating, in the different group of the extract information, the extract information of one of the files or the folder to one or a plurality of slots of a fixed length, and allocating, in the group of property, the extract information of the one file or the folder to one or a plurality of slots of the fixed length so that the group of property has at least slots corresponding to the slots of the different group to produce an index file. The slots of the group of property have set therein management information for managing the groups being set. The management information of each of the slots of the group of property has set therein valid/invalid information representative of whether the slot is valid or invalid, an extension slot number pointing to an extension slot succeeding the slot, presence/absence information representative of whether a corresponding slot of the different group to which the extract information of the file relating to the slot is allocated is present or absent, a slot number pointing to the corresponding slot of the different group, and extension information representative of whether or not the corresponding slot of the different group is an extension slot. A combination of the slots to which the extract information of the one file or the folder is allocated with the extension slot number, presence/absence information, slot number, and extension information being indicated by the group of property.

With the file management method, program for the file management method, and recording medium on which the program for the file management method is recorded, where an index file is formed from groups of data wherein extract information is collected for different types and one of the groups of data is used to collectively manage the other groups of data, a process relating to deletion or addition of extract information can be executed simply, easily and with certainty.

In summary, according to the present invention, a slot of property has recorded therein information representing whether the slot is valid or invalid and information representative of a relationship to another slot to which extract information relating to the same file is allocated. Further, a combination of slots in which the extract information of the one file is allocated is managed with a property entry and besides a free slot is re-utilized based on the combination of slots to form an index file from groups of data wherein the extract information is collected for the individual types thereof. Consequently, where one of the data groups is used to collectively manage the other data groups, a process relating to deletion or addition of extract information can be executed simply, easily, and with certainty.

BRIEF DESCRIPTION OF THE DRAWINGS

These and other objects of the invention will be seen by reference to the description, taken in connection with the accompanying drawing, in which:

FIG. 2 is a table illustrating a property entry;

FIGS. 3A and 3B are diagrammatic views illustrating registration of extract information;

FIGS. 4A and 4B are similar views but illustrating deletion of extract information;

FIGS. 5A and 5B are similar views but illustrating registration of extract information where a free slot is re-utilized;

FIGS. 6A and 6B are similar views but illustrating registration of extract information where a free slot is added;

FIGS. 7A and 7B are similar views but illustrating deletion of extract information from the state illustrated in FIGS. 6A and 6B;

FIGS. 8 and 9 are flow charts illustrating a processing procedure when the registration illustrated in FIGS. 5A and 5B is performed;

FIGS. 18A to 18D are a diagrammatic view illustrating an index file.

DETAILED DESCRIPTION OF THE PREFERRED EMBODIMENTS

1. First Embodiment 1-1. Configuration of the Optical Disk Apparatus

Figure 1:
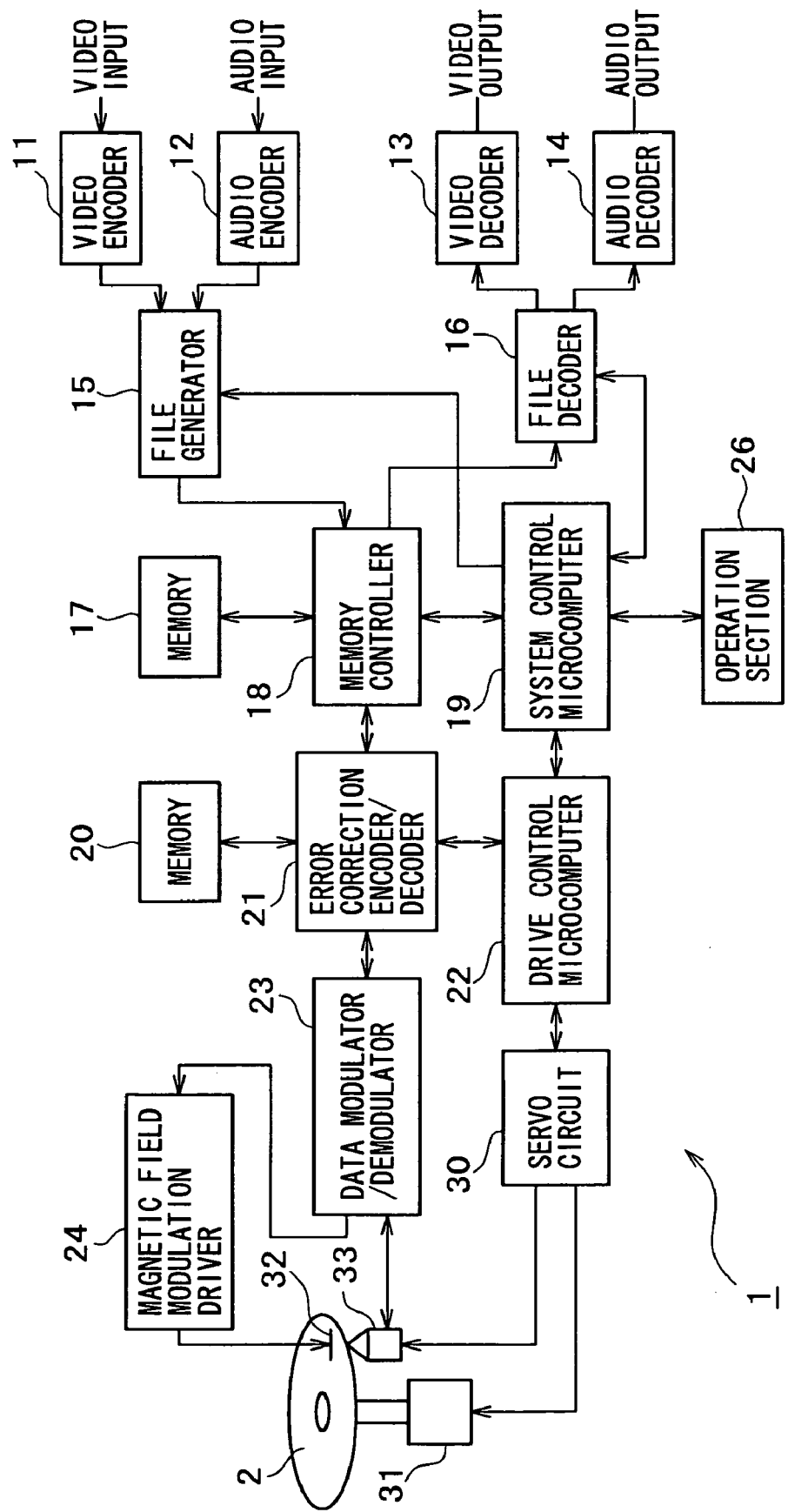
FIG. 1 is a block diagram showing an optical disk apparatus according to a first embodiment of the present invention.

FIG. 1 shows an optical disk apparatus according to a first embodiment of the present invention. The optical disk apparatus 1 acquires a video signal and an audio signal of an image pickup object by means of an image pickup section and a sound acquisition section not shown and records a result of image pickup as the video signal and audio signal on an optical disk 2. Further, the optical disk apparatus 1 reproduces the result of the image pickup recorded on the optical disk 2 and outputs it from a displaying section in the form of a liquid crystal display panel and a sound outputting section in the form of a speaker and further outputs it to an external equipment. The optical disk apparatus 1 converts such a video signal and an audio signal of the image pickup result into streaming data in accordance with a format of the MPEG (Moving Picture Experts Group) and then records the streaming data in accordance with a predetermined file format on the optical disk 2. In the present embodiment, the QuickTime is applied as the predetermined file format just described. It is to be noted that, while, in the present embodiment, an index file is produced in accordance with the QuickTime format in this manner, various file formats can be applied to the index file as hereinafter described. Also as a recording medium, not only an optical disk but also various recording media such as hard disk and a flash memory can be applied.

In the optical disk apparatus 1, a video encoder 11 performs an analog/digital conversion process for a video signal of a result of image pickup to produce video data and then encodes the video data in accordance with the format of the MPEG. Consequently, an elementary stream of the video data is outputted from the video encoder 11.

An audio encoder 12 performs an analog/digital conversion process for an audio signal of a result of image pickup to produce audio data and then encodes the audio data in accordance with the format of the MPEG. Consequently, an elementary stream of the audio data is outputted from the audio encoder 12.

A file generator 15 performs, upon recording, a multiplexing process for the elementary streams outputted from the video encoder 11 and the audio encoder 12 and produces a QuickTime movie file under the control of a system control microcomputer 19.

A memory controller 18 changes over operation thereof under the control of the system control microcomputer 19. Upon recording, the memory controller 18 successively records and temporarily retains a data string of a QuickTime movie file outputted from the file generator 15 and various data outputted from the system control microcomputer 19 into a memory 17 and then outputs the retained data so as to be processed by a succeeding error correction encoder/decoder 21. On the other hand, upon reproducing, the memory controller 18 temporarily retains output data from the error correction encoder/decoder 21 and outputs the retained data to a file decoder 16 and the system control microcomputer 19.

The error correction encoder/decoder 21 changes over operation thereof under the control of the system control microcomputer 19, and upon recording, temporarily records output data from the memory controller 18 into a memory 20 and adds an error correction code to the temporarily recorded data. Further, the error correction encoder/decoder 21 reads out and outputs the data retained in the memory 20 in such a manner as just described in accordance with a predetermined order. Thereupon, the data are interleaved, and the interleaved data are outputted to a data modulator/demodulator 23. On the other hand, upon reproduction, the error correction encoder/decoder 21 temporarily records data outputted from the data modulator/demodulator 23 into the memory 20 in accordance with a predetermined order and then outputs the data conversely to those upon recording. Thereupon, the error correction encoder/decoder 21 performs a deinterleave process for the data outputted from the data modulator/demodulator 23 and outputs the data to the memory controller 18. Further, at this time, the error correction encoder/decoder 21 performs an error correction process with the error correction code added upon recording.

The data modulator/demodulator 23 changes over operation thereof under the control of the system control microcomputer 19. Upon recording, the data modulator/demodulator 23 converts output data from the error correction encoder/decoder 21 into a serial data string and then performs a modulation process for the serial data string, and outputs the modulated serial data string to a magnetic field modulation driver 24 or an optical pickup 33. On the other hand, upon reproduction, the data modulator/demodulator 23 reproduces a clock from a reproduction signal outputted from the optical pickup 33 and performs a binary identification process and a demodulation process for the reproduction signal with reference to the clock. Consequently, the data modulator/demodulator 23 acquires reproduction data corresponding to the serial data string produced upon recording and outputs the reproduction data to the error correction encoder/decoder 21.

Where a magneto-optical disk is used as the optical disk 2, upon recording, the magnetic modulation driver 24 drives a magnetic field head 32 with an output signal of the data modulator/demodulator 23 under the control of the system control microcomputer 19. Here, the magnetic field head 32 is held so as to face the optical pickup 33 with the optical disk 2 interposed therebetween, and applies a modulation magnetic field based on the output data from the data modulator/demodulator 23 to an irradiation position of a laser beam of the optical pickup 33. Consequently, in the optical disk apparatus 1, where a magneto-optical disk is used as the optical disk 2, a QuickTime movie file and so forth are recorded on the optical disk 2 using a thermomagnetic recording method.

The optical disk 2 is a disk type recording medium. In the present embodiment, as the optical disk 2, a rewritable optical disk such as a magneto-optical disk (MO), a phase change type disk, or the like is used. A spindle motor 31 drives the optical disk 2 to rotate in accordance with a condition such as a Constant Linear Velocity (CLV), a Constant Angular Velocity (CAV), a Zone Constant Linear Velocity (ZCLV), or the like suitable for the optical disk 2 under the control of a servo circuit 30.

The servo circuit 30 controls operation of the spindle motor 31 based on various signals outputted from the optical pickup 33 to perform a spindle controlling process. Further, the servo circuit 30 similarly controls the optical pickup 33 to perform a tracking control and a focus control process, and further causes the optical pickup 33 and the magnetic field head 32 to perform seek operation and executes a process such as a focus search process.

A drive control microcomputer 22 controls seek and the like operation of the servo circuit 30 in accordance with an instruction of the system control microcomputer 19.

The optical pickup 33 irradiates a laser beam upon the optical disk 2 and receives the reflected light by means of a predetermined light reception element, and then arithmetically operates a result of the light reception to produce various control signals. The optical pickup 33 outputs the control signals and further outputs a reproduction signal whose signal level varies in response to a pit string or a mark string formed on the optical disk 2. Further, the optical pickup 33 changes over operation thereof under the control of the system control microcomputer 19, and where the optical disk 2 is a magneto-optical disk, upon recording, the optical pickup 33 intermittently raises the luminous energy of the laser beam to be irradiated upon the optical disk 2. Consequently, in the optical disk apparatus 1, a QuickTime movie file or a like file is recorded onto the optical disk 2 by a pulse train method. On the other hand, where the optical disk 2 is a phase change type disk or the like, the optical pickup 33 raises the luminous energy of the laser beam to be irradiated upon the optical disk 2 in accordance with the output data from the data modulator/demodulator 23 from that upon reproduction to that upon writing. Consequently, a QuickTime movie file or the like is recorded on the optical disk 2 by applying a thermal recording method.

The optical disk apparatus 1 compresses a video signal and an audio signal of an image pickup result by means of the video encoder 11 and the audio encoder 12 to individually convert them into elementary streams and then converts the elementary streams into a QuickTime movie file by means of the file generator 15. Data of the QuickTime movie file is sent successively through the memory controller 18, error correction encoder/decoder 21, and data modulator/demodulator 23 to the optical pickup 33. The data of the QuickTime movie file is recorded on the optical disk 2 by the optical pickup 33 or by the optical pickup 33 and the magnetic field head 32 together with data of an index file and so forth.

Further, the optical disk apparatus 1 processes a reproduction signal obtained by the optical pickup 33 by means of the data modulator/demodulator 23 to obtain reproduction data and then processes the reproduction data by means of the error correction encoder/decoder 21. Consequently, a QuickTime movie file, the index file, and so forth recorded on the optical disk 2 can be reproduced, and the reproduced QuickTime movie file, index file, and so forth are outputted from the memory controller 18.

The file decoder 16 receives data of the QuickTime movie file outputted from the memory controller 18, decomposes the data into elementary streams of video data and audio data, and outputs the elementary streams. A video decoder 13 decompresses the elementary stream of the video data and outputs the decompressed elementary stream to a display apparatus or external equipment not shown. An audio decoder 14 decomposes the elementary stream of the audio data outputted from the file decoder 16 and outputs the decompressed elementary stream to a sound outputting apparatus or external equipment not shown. Consequently, in the optical disk apparatus 1, an image pickup result reproduced from the optical disk 2 can be monitored.

It is to be noted that the optical disk apparatus 1 includes an interface for allowing connection of an external apparatus such as a computer thereto. Consequently, the optical disk apparatus 1 can record output of the external apparatus in place of data of an image pickup result on the optical disk 2 and reproduce a file recorded on the optical disk 2 so that the file can be processed by the external apparatus.

An operation section 26 includes various operation elements of the optical disk apparatus 1 and a touch panel disposed on a liquid crystal display panel, and issues a notification of various operations by the user to the system control microcomputer 19.

The system control microcomputer 19 is a computer, which controls operation of the entire optical disk apparatus 1. If loading of the optical disk 2 is detected through execution of a predetermined processing procedure recorded in a memory not shown, then the system control microcomputer 19 causes the optical pickup 33 to perform seek operation to the innermost circumference and reproduce management information of a file managing system regarding the optical disk 2. Further, the system control microcomputer 19 acquires the reproduced management information from the memory controller 18 and stores it into a built-in memory. Consequently, the system control microcomputer 19 detects an address each file recorded on the optical disk 2 and a free region of the optical disk 2.

If the system control microcomputer 19 searches the management information acquired in this manner and detects that an index file is recorded on the optical disk 2, then it controls the optical pickup 33 to perform seek operation to the recorded position of the index file and reproduce the index file. Then, the system control microcomputer 19 acquires the reproduced index file from the memory controller 18 and records and retails it into and in the built-in memory. Consequently, in the present embodiment, the overall operability is improved in processing of files recorded on the optical disk 2 through utilization of the index file. It is to be noted that the index file can be recorded on the innermost circumference side of a user area of the optical disk 2 to reduce the built-up time.

The system control microcomputer 19 controls operation of the entire optical disk apparatus 1 using the index file in response to an operation of the user. In particular, the system control microcomputer 19 causes thumbnail images and so forth to be displayed on a liquid crystal display panel for monitoring based on the index file to introduce contents of QuickTime movie files recorded on the optical disk 2. Then, the system control microcomputer 19 accepts selection of a file by the user from among the introduced QuickTime movie files and causes the file selected by the user to be reproduced based on corresponding management information.

On the other hand, if an instruction to record an image pickup result is issued by the user, then the system control microcomputer 19 detects a free region in accordance with the management information and causes the optical pickup 33 to perform seek operation to the free region, and records successively obtained image pickup results onto the optical disk 2. Further, the system control microcomputer 19 updates the management information retained in the memory so as to correspond to records of QuickTime movie files by such recording of the image pickup results. Then, upon ejection of the optical disk 2 or the like, the system control microcomputer 19 updates the management information of the optical disk 2 in accordance with the updated management information. It is to be noted that the updating of the management information is executed by outputting the management information retained and updated in the memory to the error correction encoder/decoder 21 through the memory controller 18.

In the processes described above, the system control microcomputer 19 outputs various kinds of information necessary for production of a QuickTime movie file to be used for recording to the file generator 15. Further, the system control microcomputer 19 acquires information necessary for production of an index file through the file generator 15. The system control microcomputer 19 uses the thus acquired information, information outputted to the file generator 15, and other necessary information to update the index file retained in the memory regarding a QuickTime movie file to be recorded newly on the optical disk 2. Then, the system control microcomputer 19 updates the index file recorded on the optical disk 2 with the updates index file retained in the memory in a similar manner as in the updating process of management information.

On the other hand, if an instruction to perform editing such as deletion of a file recorded or addition of a file to be recorded on the optical disk 2 is issued by the user, then the system control microcomputer 19 updates the index file and the management information retained in the memory in a similar manner as upon recording so as to cope with processing in the editing. Then, the system control microcomputer 19 updates the index file and the management information of the optical disk 2 with the index file and the management information retained in the memory. It is to be noted that, if the index file is not recorded although QuickTime movie files are recorded on the optical disk 2, the system control microcomputer 19 produces an index file in accordance with an instruction of the user. Then, the system control microcomputer 19 retains the index file into the memory and records the index file on the optical disk 2. In this process, the system control microcomputer 19 reproduces pertaining portions of QuickTime movie files from the optical disk 2 to acquire information necessary for production of an index file from the memory controller 18.

1-2. Index File

In the present embodiment, the index file is used to manage information necessary for reproduction by a file management system of the optical disk 2 such as an address of a recorded position, a file name, and a file length of a file similarly to various files recorded on the optical disk 2 such as a QuickTime movie file. The index file includes extract information of management object files and so forth for introduction of contents of the QuickTime movie files of an object of management recorded on the optical disk 2.

If a QuickTime movie file recorded on the optical disk 2 is selected based on the index file, then the optical disk apparatus 1 reproduces the selected file from the optical disk 2 based on the file management system of the optical disk 2. Consequently, even where a large number of QuickTime files are recorded on the optical disk 2, the optical disk apparatus 1 can select a desired file rapidly and accurately, and therefore, the operability can be improved as much.

In the present embodiment, the index file allocates extract information, which is extracted from information relating to QuickTime movie files, and other necessary information to information introducing contents of the QuickTime movie files. Therefore, the contents of the QuickTime movie files can be grasped simply and readily from the index file.

The index file is composed of four files including a property entry, a thumbnail picture entry, a text entry, and a sound entry described hereinabove as an example with reference to FIGS. 18A to 18D and is written and read between the optical disk 2 and the memory in accordance with an instruction of the system control microcomputer 19.

The extract information is extracted from part of management object files, which introduce contents of the management object files with the index file. Therefore, although the extract information varies depending upon the types of the management object files, where the management object files are QuickTime movie files of video data and audio data as in the present embodiment, four kinds of data, that is, property data, text data, thumbnail picture data, and sound data are applied to the extract data. It is to be noted that only the property data is essentially required while the other kinds of data may be selectively deleted or data of some other group or groups of a different kind or kinds not listed here may be additionally used depending upon circumstances.

The property data is attribute information, which represents an attribute of the disk title or a management object file, and extract information in the form of binary data set to the disk title or a management object file is allocated together with management information of the other extract information and so forth. The text data includes data representative of a character string of the disk title or the title of a management object file.

The thumbnail picture data includes data of a still picture representative of the disk title or contents of a management object file, and, for example, the top picture of a management object file is allocated to the thumbnail picture of the management object file. In contrast, to the thumbnail picture of the disk title or the like, a thumbnail picture, for example, of a specific management object file is allocated in accordance with selection of the user. It is to be noted that the thumbnail picture of each management object file may otherwise be set by selection of the user.

The sound data is audio data for a short period of time representative of the disk title or contents of a management object file. To the sound data of a management object file, audio data for several seconds, typically for 5 seconds, for example, after reproduction of a corresponding file is started is allocated. In contrast, to the sound data of the disk title or the like, sound data, for example, of each specific management object file is allocated by selection of the user. It is to be noted that also the sound data of a management object file may otherwise be set by selection of the user.

Thus, in the optical disk apparatus 1, the system control microcomputer 19 acquires and decodes video data and audio data compressed by the file generator 15 and produces a thumbnail picture from the video data through sampling of pixels of the video data. Meanwhile, with regard to the audio data, a required portion of it is cut out to produce sound data. Further, the system control microcomputer 19 produces title data from file information of each management object file stored in the file management system of the optical disk 2 in accordance with setting of the user. In contrast, the property data is produced in response to an operation of the user by the system control microcomputer 19. It is to be noted that such thumbnail picture and sound data are compressed and allocated to the index data atom as occasion demands.

The index file includes actual data grouped for the individual kinds of extract information and collected for the individual groups such that the extract information forms a plurality of data sets grouped for the individual kinds thereof. In the index file, headers PH, THH, TXH, and SH are set at the tops of the individual groups as seen in FIGS. 18A to 18D, respectively, and in each group, following the header PH, THH, TXH, or SH, actual data are allocated to slots of a fixed length. Consequently, in the index file, extract information formed from a train of slots following each of the headers PH to SH is registered, and the property entry E4, thumbnail picture entry E3, text entry E2, and sound entry E1 described hereinabove with reference to FIGS. 18A to 18D are formed individually. Where it is difficult to allocate extract information regarding a file or the like to one slot, extract information from a management object file or the like is allocated to a plurality of slots.

To the header at the top of each of the groups, information describing the entire group such as the size of the slots of the group and the total number of the slots is set. Further, from among the four groups, only the property group is essentially required.

Consequently, when the optical disk apparatus 1 performs a search for a desired file with reference to a thumbnail picture, for example, in accordance with an instruction of the user, it reproduces the thumbnail entry to successively acquire data of thumbnail pictures and display the acquired data of thumbnail pictures to accept an instruction of the user.

1-3. Management with the Property Entry

The property entry has registered therein extract information not only of files recorded on the optical disk 2, which are management object files, but also existing folders, virtual folders, and management object files virtually disposed in the virtual folders according to the file management system for the optical disk 2. To each slot of the property entry, a slot number (entry number) for specifying the slot and identification information for identification among an existing file, an existing folder, a virtual file, and a virtual folder are set as seen in FIG. 2. It is to be noted that also the other entries described hereinabove can have similarly registered therein existing folders, virtual folders, and management object files virtually disposed in the virtual folders. Consequently, the index file can be used to manage the management object files in accordance with a hierarchical structure ready for the file management system for the optical disk 2 or in accordance with a hierarchical structure based on virtual folders including favorite files or the like set by the user.

Further, the property entry is formed from slots having a fixed length similarly as in the other entries. Consequently, if extract information regarding the property cannot be allocated to one slot, a plurality of slots are allocated to one management object file or one folder. It is to be noted that, where a plurality of slots are allocated to a file or a folder in the property entry or the other entries, any other slot than the top slot is hereinafter referred to as extension slot.

Further, where a plurality of slots are set for one management object file or slot similarly in any of the other entries, also in the property entry, a plurality of slots are allocated so as to correspond to the slots of the other entry.

Consequently, for example, to a folder or the like in which none of the text entry, thumbnail picture entry, and sound entry is set, extract information corresponding to one or a plurality of slots is allocated in accordance with the data amount of the extract information regarding the property. Meanwhile, to a file or a folder in which each of the text entry, thumbnail picture entry, and sound entry is formed from one slot, extract information corresponding to one or a plurality of slots is allocated in accordance with the data amount of the extract information regarding the property similarly. On the other hand, to a file or a folder in which any of the text entry, thumbnail picture entry, and sound entry is formed from a plurality of slots, a number of slots corresponding to the entry, which includes the great number of slots among the text entry, thumbnail picture entry, and sound entry, are set even where the data amount of the extract information regarding the property is sufficiently small.

In the property entry, each of the slots has set therein for each of the text entry, thumbnail picture entry, and sound entry a presence/absence flag, which represents whether or not there exists a corresponding slot in the text entry, thumbnail picture entry, or sound entry. Further, a slot number, which is identification information pointing to the corresponding slot is set for each of the text entry, thumbnail picture entry, and sound entry.

Further, in the property entry, when a succeeding slot to a particular slot exists, an extension slot number, which is information representative of the succeeding slot number, is set in the plural slots. It is to be noted that, where no corresponding slot exists, a value having no meaning is set to the extension slot number and the slot numbers. Consequently, where one slot is allocated to the tail one of the plural slots and one entry, presence/absence of a corresponding to the other entries and so forth can be detected.

Furthermore, in the property entry, where a corresponding slot of another entry to a slot thereof is an extension slot, an extension flag as extension information representing that the corresponding slot of the different entry is an extension slot is set corresponding to the text entry, thumbnail picture entry, or sound entry.

Further, in each slot of the property entry, a valid/invalid flag representing whether the slot is valid or invalid is set so as to cope with deletion of a management object file only by an operation of the flag. It is to be noted that, in each slot of the property entry, for example, information of a referencing relationship regarding a divisional file, information of an order of reproduction, and so forth are allocated additionally as management information.

Consequently, if the extension slot number representative of a succeeding extension slot is successively traced to detect a slot of the property entry, the slots of the property in the property entry to which extract information of one file or one folder can be detected. Further, the slots of the other entries to which the extract information of the one file or folder is allocated can be detected with reference to the presence/absence flag, slot number, and extension flag set to the slots of the property entry detected in this manner. Consequently, a combination of slots to which the extract information of the one file or folder is allocated can be detected with reference only to the different kinds of information of the property.

From the foregoing, in the present embodiment, where an index file is formed from groups of data wherein extract information is collected for different types and the property entry, which is one of the groups of data is used to collectively manage the other groups of data, a process relating to deletion or addition of extract information can be executed simply, easily, and with certainty by processing of the presence/absence flags, slot numbers, extension slot number, extension flags, and valid/invalid flag described above.

In particular, in management of free or empty slots through setting and updating of the presence/absence flags, slot numbers, extension slot number, extension flags, and valid/invalid flag, if the index file does not include a free slot, the system control microcomputer 19 adds a required number of slots to the tail end of the property entry in order to add a management object file or folder, adds a required number of slots to each of the text entry, thumbnail picture entry, and sound entry, and allocates corresponding extract information individually to the slots added in this manner. At this time, the presence/absence flags, slot numbers, and extension slot numbers for the entries described hereinabove with reference to FIG. 2 are set so as to individually match with the allocation of the extract information to the entries, and the extension slot number and the valid/invalid flag are set to the corresponding slot of the property entry.

Consequently, in such a case as described above, the system control microcomputer 19 adds, for example, three files. If only one slot of the property entry is required for each of the three files, the system control microcomputer 19 adds three slots PESn, PESn+1, and PESn+2 to the tail end of the property entry E4. Further, the system control microcomputer 19 sets the valid/invalid flag in each of the three added slots PESn, PESn+1, and PESn+2 to valid and sets a value having no meaning (a null value; in the following description and in the drawings, represented as empty) to the extension slot number.

Where the thumbnail picture entry E3 is not registered into the index file as seen in FIG. 3B, the thumbnail presence/absence flag is set to absence in the corresponding slot PESn of the property and a value (empty) having no meaning and NO are set to the corresponding thumbnail slot number and the corresponding thumbnail extension flag, respectively.

On the other hand, when one slot is to be registered into the thumbnail picture entry E3 in a corresponding relationship to each of the files to be added, in the corresponding slots PESn+1 and PESn+2 of the thumbnail picture entry E3, the thumbnail presence/absence flag is set to presence and the slot numbers of the slots THEm and THEm+1 of the corresponding thumbnails are set in the corresponding thumbnail slot numbers while NO is set to the thumbnail extension flags.

When the entire extract information, for example, of the slots PESn and PESn+2 is to be deleted by a deletion operation of a management object file or folder in a state wherein the index file is updated in this manner, the system control microcomputer 19 operates in the following manner. In particular, as seen in FIGS. 4A and 4B, the system control microcomputer 19 sets the valid/invalid flags of the slots PESn and PESn+2 to invalid and sets values having no meaning (empty and NO) to the extension slot numbers and the thumbnail extension flags, respectively. However, the system control microcomputer 19 does not change the thumbnail slot numbers but maintains the values as they are. It is to be noted that, in the following description, a process of setting the extension slot number, the other entry presence/absence flag, and the other entry extension flag to empty, absence, and NO, respectively, is referred to as initialization process.

Consequently, the system control microcomputer 19 can perform a simple process to delete an entire registration of extract information to produce a free slot, and the free slot produced in this manner maintains a relationship of a combination of slots to which extract information of one original file or folder is allocated. Therefore, such a situation (leak state) that some slot is in the air without being referred to from any other slot is prevented.

When only a registration of extract information regarding some other entry such as the thumbnail picture entry is to be deleted, the presence/absence flag regarding the corresponding entry is set to absence and the thumbnail extension flag is set to NO while the other settings are maintained (refer to FIGS. 7A and 7B). More particularly, for example, when only the slot THEm of the thumbnail picture entry is to be deleted, only the presence/absence flag of the corresponding entry is set to absence and the thumbnail extension flag is set to NO in the corresponding slot PESn+1 of the property entry thereby to set the thumbnail picture slot THESm as a free slot. Also by this, the system control microcomputer 19 can perform a simple and easy process to delete a registration of extract information itself to produce a free slot while a combination of original slots is maintained. Consequently, a situation (leak state) wherein some slot is in the air without being referred to from any other slot is prevented.

From the foregoing, in the index file, the property entry can be used to control the other entries in a unified manner to produce a free slot wherein the valid/invalid flag and the presence/absence flags are set to invalid and absence, respectively, by deletion of a file or a folder, editing of the index file, and so forth.

When extract information is to be additionally registered by addition of a file or a folder, editing of the index file, and so forth, the system control microcomputer 19 detects a free slot of the property entry with reference to the valid/invalid flag and re-utilize the free slot. Further, upon such setting of a free slot, the system control microcomputer 19 makes effective use of information of the slot number maintained till then and makes effective use of a slot group (hereinafter referred to as combination of free slots) detected based on the information to register the extract information. In this instance, the extension slot number is set to empty in the overall deletion of extract information so that, in the present embodiment, a combination of such free slots is produced in a unit of one slot of the property entry. This also executes various processes repetitively to prevent appearance of a slot in a leak state in the thumbnail picture entry and so forth.

In particular, the system control microcomputer 19 searches the property entry to detect those slots whose valid/invalid flag is set to invalid to detect free slots of the property entry. Further, the system control microcomputer 19 traces a setting of an extension slot number set in the free slot detected in this manner to detect a combination of free slots. Further, the system control microcomputer 19 detects the numbers of slots of entries necessary for recording of the extract information to be registered additionally, detects a combination of free slots having the numbers of slots of the entries necessary for the additional registration, and registers the extract information to be registered additionally into the combination of slots. Furthermore, the system control microcomputer 19 sets the valid/invalid flags of the free slots to valid.

When the extract information is registered into the combination of corresponding free slots in this manner, since the entry numbers representative of corresponding relationships to the other entries maintain the values prior to the deletion, the other free slots are allocated as they are, and consequently, the extract information can be registered additionally by a simple and easy operation.

In this instance, from between the free slots PESn and PESn+2 of the property entry E4 of FIG. 4A, the slot PESn itself forms a combination of free slots while the other slot PESn+2 cooperates with the thumbnail slot THEm+1 to form another combination of free slots. In such an instance, where extract information of the property entry for one slot is to be registered, if the slot PESn is searched out as a free property slot, then the property information is registered into the slot PESn. If thumbnail picture data is to be added for one slot to the entry, one thumbnail slot is added to the tail end of the thumbnail picture entry and the slot PESn is set so as to point to the added slot, and then the thumbnail picture data is written into the added thumbnail slot. Or, as an alternative method, if an invalid slot is present in the thumbnail picture entry (in this instance, the slot THEm+1 of FIG. 4B is an invalid slot), then the property slot PESn is set so as to point to the invalid slot while the field, which has pointed to the invalid thumbnail slot (in this instance, THEm+1) from the property slot (in this instance, PESn+2), is set to "empty" and the thumbnail picture data is written into the acquired thumbnail slot. In any case, at a final stage, the thumbnail presence/absence flag is set to "presence" and the thumbnail extension flag is set to "NO" to change the thumbnail slot into a valid thumbnail slot. It is to be noted that, when a file with regard to which it is known from the beginning that thumbnail picture data is to be added for one slot in the state of FIGS. 4A and 4B is to be registered, such a method as just described may be used, but alternatively a property slot, which holds an invalid thumbnail slot (in the case of FIGS. 4A and 4B, PESn+2 and THEm+1), may be searched for from the beginning to write attribute information and thumbnail picture data into the combination of slots.

Consequently, the system control microcomputer 19 detects a free slot in the group of the property entry with reference to the valid/invalid flag, which is valid/invalid information, detects a combination of free slots to which extract information of one file or folder was allocated in the past with reference to slot numbers pointing to corresponding slots of the other entries set to the detected free slots, and registers corresponding extract information into the detected combination of free slots. Therefore, the combination of free slots can be re-utilized effectively to effectively prevent a useless increase of free slots.

In contrast, when extract information for a plurality of slots is to be registered into the property entry, the system control microcomputer 19 couples free slots of the property entry by settings of the extension slot number and registers the extract information into the coupled free slots.

In particular, when extract information having a data amount for 2 slots is to be registered into the property entry, the slot PESn of the property entry, which is a free slot only with regard to the property entry, is detected first as seen in FIG. 4A. In this instance, only the slot PESn does not satisfy the shortage of free slots, another free slot PESn+2 is detected.

In this instance, as seen from FIG. 5A in contrast with FIG. 4A, the system control microcomputer 19 secures the two property slots PESn and PESn+2 as an object of registration and sets the valid/invalid flags of the slots PESn and PESn+2 to valid. Thereafter, the system control microcomputer 19 sets the extension slot number of the slot PESn so as to point to the slot PESn+2 from the slot PESn, that is, so that the slot PESn+2 becomes an extension slot of the slot PESn thereby to form a combination of free slots including the two property slots PESn and PESn+2 and the one thumbnail slot THEm+1.

The system control microcomputer 19 registers the other extract information and management information into the property slots PESn and PESn+2. In this instance, the free slot THEm+1 of the thumbnail picture entry pointed to by the slot number of the property slot PESn+2 is maintained as a free slot.

Consequently, when extract information for a plurality of slots is to be registered into the property entry, the system control microcomputer 19 sets the extension slot number of each of the slots so that the detected free property slots may form a list structure and register the extract information into the slots. This can also reduce useless free slots and register the extract information efficiently.

Further, where, in the process of registration of the property entry, extract information for a different one of the entries is to be registered simultaneously, if free slots sufficient for the extract information for the different entry are detected based on the slot number of the corresponding entry set to the slot of the property entry, which is an object of registration, then in this instance, the extract information for the different entry is registered into the free slots and the presence/absence flag and the extension flag are set so as to match with the registration. At this time, the system control microcomputer 19 sets the presence/absence flag, extension flag, and slot number so as to successively point to the corresponding slot of the different entry from the top side of the corresponding slot of the property entry. In particular, when, in the example illustrated in FIGS. 5A and 5B, extract information is to be registered into the slots PESn and PESn+1 of the property entry and the free slot THEm+1 of the thumbnail picture entry, the slot number and the extension flat set in the slot PESn+1 in FIG. 5A are copied into and set to the top side slot PESn of the property entry. Further, the slot number and the extension flag in the slot PESn+1 are set to empty and NO, respectively. Further, the presence/absence flag in the slot PESn is set to presence.

In contrast, where no such free slot is present and further where the number of free slots of the property entry is insufficient when extract information is to be registered into the property entry, the system control microcomputer 19 adds a number of slots corresponding to the shortage, re-sets the extension slot numbers with regard to the added slots, and registers the extract information into the free and added slots of the property entry.

In particular, for example, where the combination of the slot PESn of the property entry, which is only one slot in the property entry, and the slot PESn+2 of the property entry and the slot THEm+1 of the thumbnail picture entry, which are each only one slot in the property entry or the thumbnail picture entry, is present as described hereinabove with reference to FIGS. 4A and 4B, if extract information for three slots and for two slots is to be registered into the thumbnail picture entry and the property entry, respectively, the thumbnail picture entry and the property entry are short of slots by one slot and two slots, respectively.

In this instance, the system control microcomputer 19 adds the numbers of slots corresponding to the shortages to the tail ends of the corresponding entries as seen in FIGS. 6A and 6B, respectively. It is to be noted that the added slots are denoted by PES+1, THEp+1, and THEp+2, respectively. Consequently, the system control microcomputer 19 sets free slots, which are not associated with any other slot, to the tail ends of the entries.

Thereafter, the system control microcomputer 19 secures the free slots PESn and PESn+2 of the property entry and the free slot PESo+1 added to the property entry as an object of registration and sets the valid/invalid flags of the slots PESn, PESn+2, and PESo+1 to valid. Further, the extension slot numbers of the slots PESn and PESn+2 are set as seen from pointing to the slot PESn+2 from the slot PESn and as seen from pointing to the slot PESo+1 from the slot PESn+2. Consequently, a combination of the three slots PESn, PESn+2, and PESo+1 of the property entry and the one slot THEm+1 of the thumbnail entry is formed.

Further, the system control microcomputer 19 sets the presence/absence flags in the slots PESn and PESo+1 of the property entry, whose thumbnail presence/absence flags have been set to absence, to presence and sets the slot numbers of the slots PESn and PESo+1 so as to point to the slots THEp+1 and THEp+2 of the thumbnail entry thus added, respectively. Consequently, a combination of the three slots PESn, PESn+2, and PESo+1 of the property entry and the three slots THEm+1, THEp+1, and THEp+2 of the thumbnail picture entry is formed.

Then, the system control microcomputer 19 registers extract information into the free slots PESn, PESn+2, PESo+1, THEm+1, THEp+1, and THEp+2 of the combination. It is to be noted that, also in this instance, the information of the slot number in the slot PESn+2 of the property entry in which a link relationship (slot number) to the thumbnail picture entry is originally set is maintained as it is so that the processing for registration of the type described can be simplified. Consequently, in the example illustrated in FIGS. 6A and 6B, the property entry has extract information registered in the order of a row while the thumbnail picture entry has extract information registered in an order different from the order of a row.

Consequently, where a combination of detected free slots gives rise to shortage of slots, the system control microcomputer 19 adds the number of slots corresponding to the shortage, adds the added slots to the combination of free slots, and registers extract information into all of the slots.

It is to be noted that, when only the extract information of the thumbnail picture entry is to be deleted in the state wherein the extract information is registered in such a manner as described above, the system control microcomputer 19 sets the thumbnail presence/absence flag and the extension flag of the corresponding slot of the property entry to absence and NO, respectively, while the other associated slot numbers are maintained as they are as seen from FIG. 7A in contrast with FIG. 6A.

Figure 9:
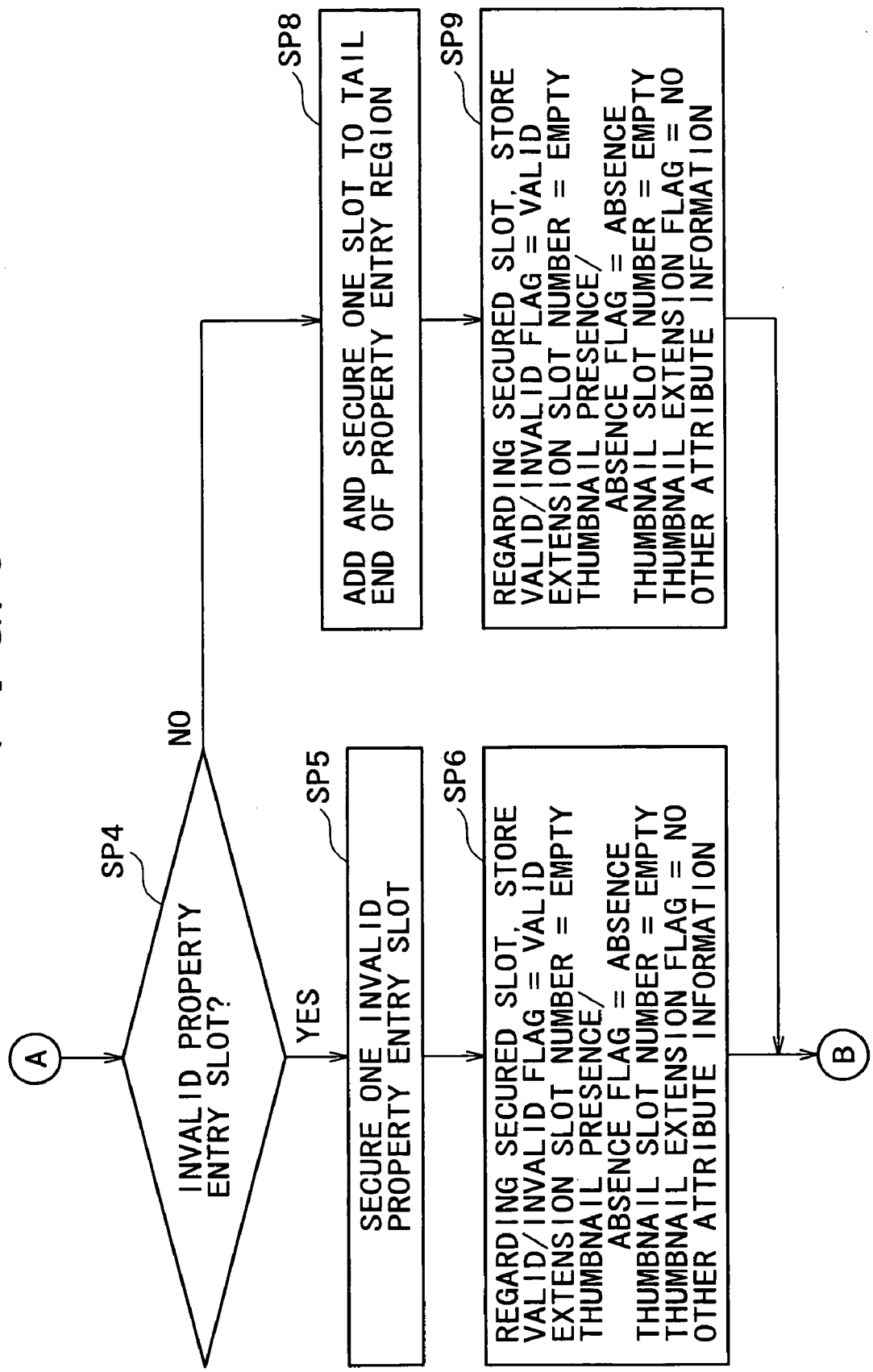

FIGS. 8 and 9 illustrate a processing procedure for setting of an extension slot number by the system control microcomputer 19 when only the property entry is to be registered. After the processing procedure is started, the system control microcomputer 19 advances its processing from step SP1 to step SP2, at which it detects the number of slots necessary for registration of a property entry and sets the number to a variable n.

Thereafter, the system control microcomputer 19 advances the processing to step SP3, at which it discriminates whether or not the variable n is greater than 0. If an affirmative result is obtained, then the system control microcomputer 19 advances the processing to step SP4. At step SP4, the system control microcomputer 19 discriminates whether or not there exists a free slot whose valid/invalid flag is set to invalid. If an affirmative result is obtained, then the processing advances to step SP5, at which the system control microcomputer 19 secures the free slot. Then at step SP6, the system control microcomputer 19 sets the valid/invalid flag and the slot number of the free slot to valid and empty, respectively, as described hereinabove while it maintains the extension slot number, presence/absence flags, and extension flags in the initial state as upon setting of the free slot and besides registers extract information. Thereafter, the processing advances to step SP7.

On the other hand, if a negative result is obtained at step SP4, then the system control microcomputer 19 advances the processing from step SP4 to step SP8, at which it adds the slot to the tail end of the property entry to secure the slot as a free slot. Then at next step SP9, the system control microcomputer 19 sets the valid/invalid flag and so forth of the free slot and registers the extract information as described above. Thereafter, the processing advances to step SP7.

Consequently, when the number of free slots detected with reference to the valid/invalid flag is insufficient, the system control microcomputer 19 adds a slot or slots and registers extract information of the property. After the extract information and so forth are registered in this manner, the system control microcomputer 19 discriminates, at step SP7, whether or not the slot to which the extract information has been set at immediately preceding step SP6 or SP9 is an extension slot, that is, whether or not the slot is any other slot than the top slot where extract information is registered into a plurality of slots in one entry. If a negative result is obtained, then the system control microcomputer 19 advances the processing from step SP7 to step SP10, at which it decrements the variable n by the value 1. Thereafter, the processing returns to step SP3.

Consequently, the system control microcomputer 19 repeats the processing procedure by a number of times required for the registration to successively register the extract information of the property. In the second and following repetitions of the processing procedure, an affirmative result is obtained by the system control microcomputer 19 at step SP7. Consequently, the system control microcomputer 19 now advances the processing from step SP7 to step SP11. At step SP11, the system control microcomputer 19 sets the extension slot number of the slot registered formerly by the repetitions of the processing procedure so as to point to the slot relating to the registration at the immediately preceding step SP6 or SP9. Thereafter, the processing advances to step SP10.

Consequently, the system control microcomputer 19 successively sets an extension slot number to repeat the processing procedure by a number of times equal to the number of slots necessary for the registration. Then, after the registration of all of the slots is completed, a negative result is obtained at step SP3. Consequently, the processing advances from step SP3 to step SP12, at which the system control microcomputer 19 ends the processing procedure.

Figure 10:
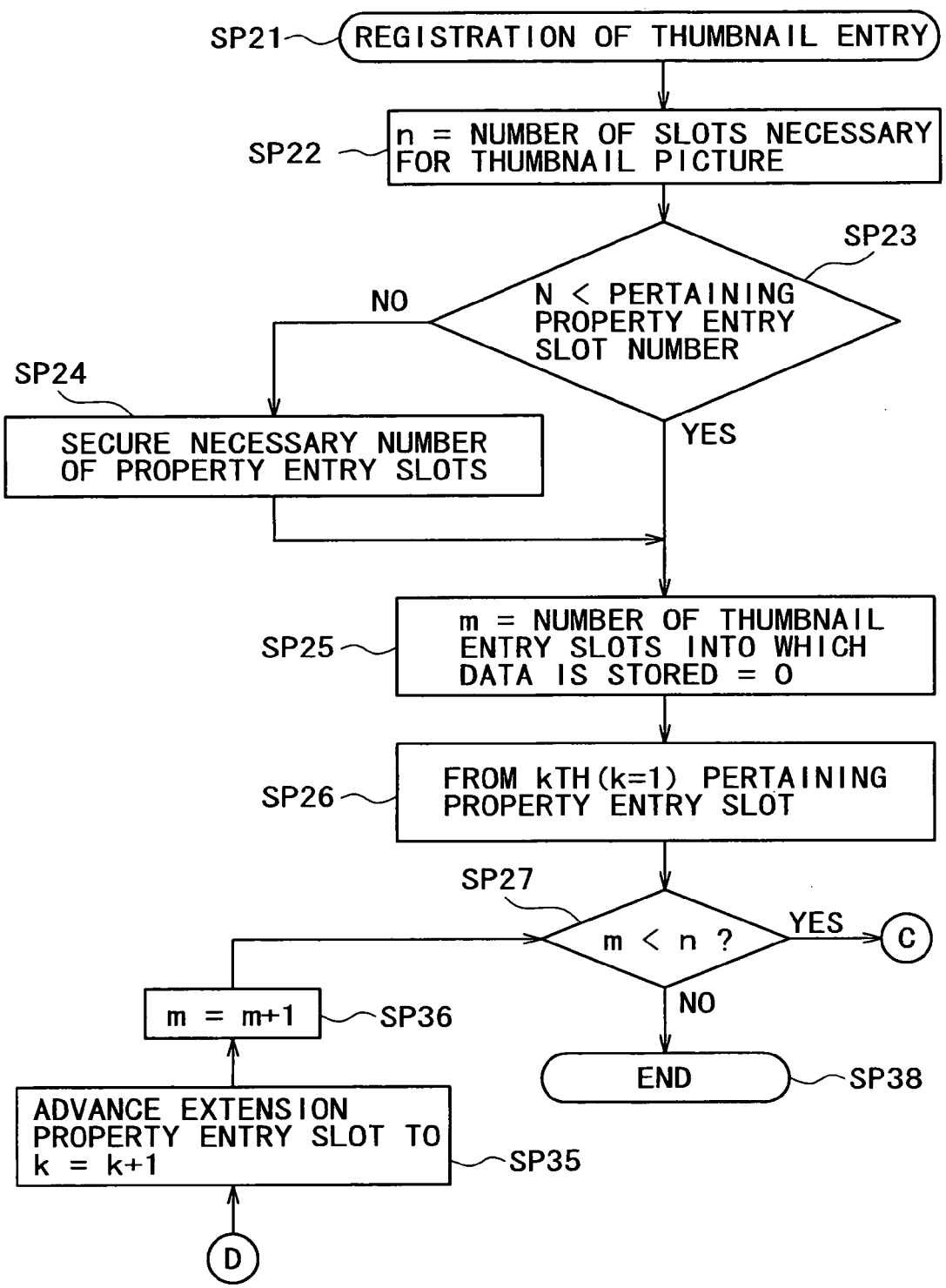
FIGS. 10 and 11 are flow charts illustrating a processing procedure when the registration illustrated in FIGS. 6A and 6B is performed.
Figure 11:
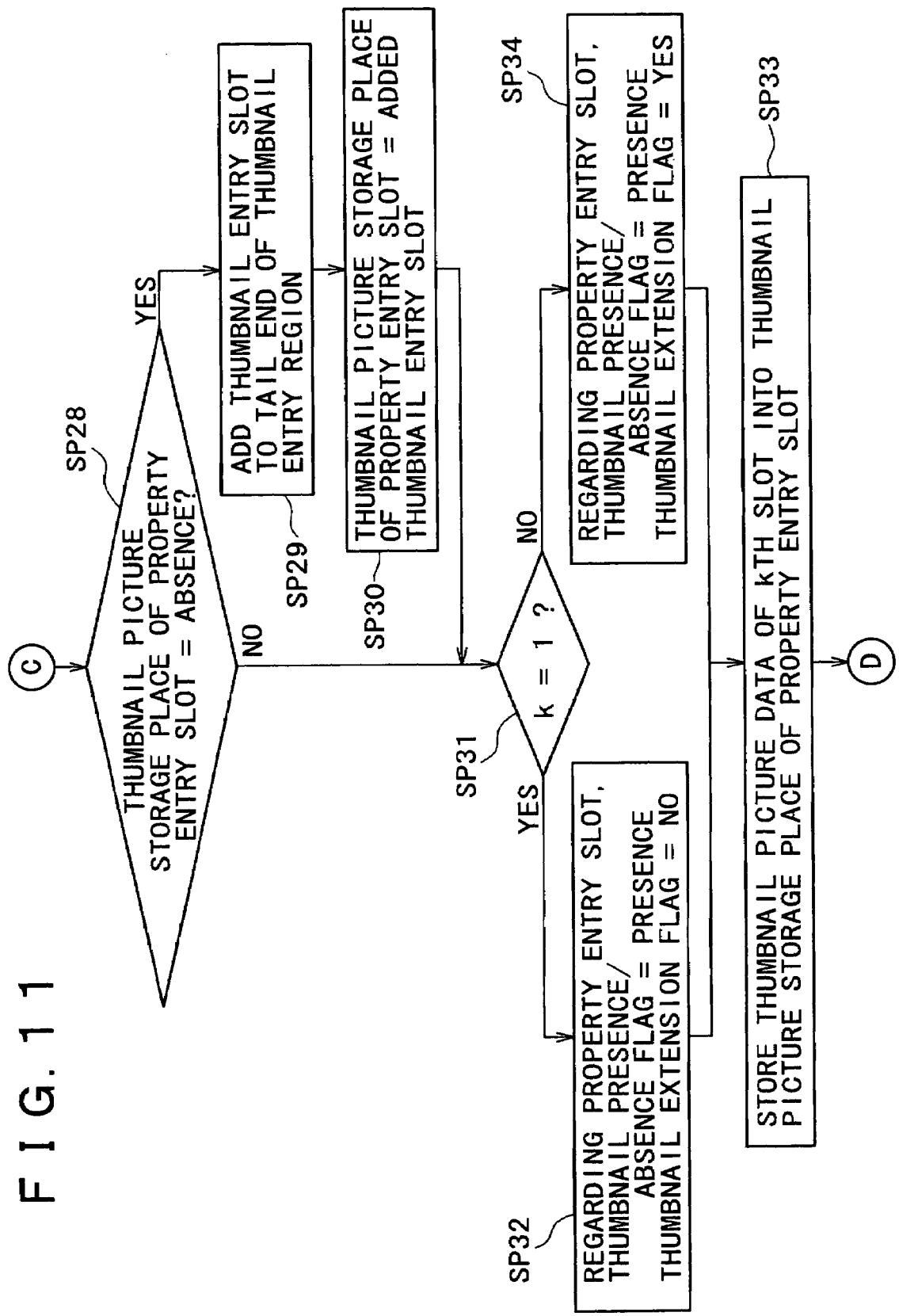

On the other hand, FIGS. 10 and 11 illustrate a processing procedure by the system control microcomputer 19 when extract information of a thumbnail picture is registered. After the processing procedure is started, the system control microcomputer 19 advances its processing from step SP21 to step SP22, at which it detects the number of slots necessary for registration into the thumbnail picture entry and sets the number to a variable n. Then at step SP23, the system control microcomputer 19 discriminates whether or not the number of slots regarding extract information to be registered into the property entry in the registration of the property entry corresponding to the registration into the thumbnail picture entry is greater than the variable n set at step SP22. If a negative result is obtained, then the processing advances to step SP24, at which the system control microcomputer 19 secures a number of free slots equal to the insufficient number of slots in the property entry. Thereafter, the processing advances to step SP25. It is to be noted that the operation to secure free slots in the property entry is executed in accordance with the processing procedure described hereinabove with reference to FIGS. 9 and 10. On the other hand, if an affirmative result is obtained at step SP23, then the processing advances directly to step SP25.

At step SP25, the system control microcomputer 19 sets a variable m representative of the number of slots of the thumbnail picture entry with which storage of extract information is completed to the value 0. Then at next step SP26, the system control microcomputer 19 sets a slot number k of the property entry corresponding to the thumbnail picture entry with which the storage of extract information is completed to the value 1. Thereafter, the processing advances to step SP27, at which the system control microcomputer 19 discriminates whether or not the variable m is smaller than the variable n.

If an affirmative result is obtained, then the system control microcomputer 19 advances the processing from step SP27 to step SP28, at which it detects a free slot from within the property entry and discriminates whether or not the presence/absence flag, which indicates presence of a corresponding thumbnail slot, is set to absence in the free slot. If an affirmative result is obtained, then the system control microcomputer 19 advances the processing from step SP28 to step SP29, at which it adds the thumbnail slot as a free slot to the tail end of the thumbnail picture entry. Then at next step SP30, the system control microcomputer 19 sets the slot number to the free slot of the property entry detected by the process at step SP28 so as to point to the free slot added at step SP29. Thereafter, the processing advances to step SP31. On the other hand, if a negative result is obtained at step SP28, then the processing advances directly from step SP28 to step SP31.

At step SP31, the system control microcomputer 19 discriminates whether or not the slot number k is equal to the value 1. If an affirmative result is obtained, then the processing advances from step SP31 to step SP32, at which the system control microcomputer 19 sets the thumbnail presence/absence flag to presence and sets the thumbnail extension flag to NO in the free slot of the property entry detected at step SP28. Thereafter, the processing advances to step SP33. On the other hand, if a negative result is obtained at step SP31, then the system control microcomputer 19 advances the processing from step SP31 to step SP34, at which it sets the thumbnail presence/absence flag to presence and sets the thumbnail extension flag to YES. Thereafter, the processing advances to step SP33.

At step SP33, the system control microcomputer 19 allocates the extract information corresponding to an order number indicated by the slot number k into the free slot of the thumbnail picture entry pointed to by the slot of the property entry detected at step SP28 or the free slot of the thumbnail picture entry added at step SP30. Thereafter, the processing advances to step SP35, at which the system control microcomputer 19 increments the slot number k by the value 1. Then at next step SP36, the system control microcomputer 19 increments the variable m by the value 1 similarly, whereafter it returns the processing to step SP27. Consequently, where the number of free slots is insufficient, the system control microcomputer 19 adds a slot or slots of each of the property entry and the thumbnail picture entry and successively registers the property and thumbnail extract information into the added slots. Then, if the registration of all of the extract information is completed, then a negative result is obtained at step SP27. Consequently, the processing now advances from step SP27 to step SP38, at which the system control microcomputer 19 ends the processing procedure.

It is to be noted that the system control microcomputer 19 executes a process similarly also for registration of extract information of the other text and sound entries as well as for registration of a combination of the extract information of them and extract information relating to combinations of the thumbnail picture entry and the property entry.

1-4. Operation of the First Embodiment

In the optical disk apparatus 1 (FIG. 1) having such a configuration as described above, video data and audio data acquired by the image pickup system and the sound acquisition system are encoded by the video encoder 11 and the audio encoder 12, respectively, and then converted into a data stream of a QuickTime movie file by the file generator 15. The data stream is recorded on an optical disk 2 by a recording system formed from the memory controller 18, error correction encoder/decoder 21, data modulator/demodulator 23, magnetic field modulation driver 24, and optical pickup 33. Consequently, in the optical disk apparatus 1, an image pickup result is recorded as a QuickTime movie file on the optical disk 2. Further, output data of the system control microcomputer 19 is outputted to the recording system of the optical disk apparatus 1 so as to be compatible with the recording of the file of the optical disk 2. Consequently, management information of the file management system for the optical disk 2 is updated so as to be compatible with the recording of the QuickTime movie file.

The QuickTime movie file recorded in this manner is successively reproduced through the optical pickup 33, data modulator/demodulator 23, error correction encoder/decoder 21, and memory controller 18 based on the management information of the file management system and then decomposed into elementary streams of video data and audio data by the file decoder 16. The elementary streams of video data and audio data are decoded by and outputted from the video decoder 13 and the audio decoder 14, respectively.

In the optical disk apparatus 1, upon such recording of a QuickTime movie file, data for thumbnail pictures and data for sound are acquired from the file generator 15 by the system control microcomputer 19, and data of a title is acquired by the system control microcomputer 19 through inputting of the user or the like before or after the recording of the file. Further, information of a file name and so forth regarding the file management system is acquired. Then, extract information of the QuickTime movie file to be recorded on the optical disk 2 is collected by the system control microcomputer 19. In the optical disk apparatus 1, an index file is produced with the extract information acquired in such a manner as described above in the memory built in the system control microcomputer 19 similarly to the management information regarding the file management system for the optical disk 2, and the index file is recorded on the optical disk 2 similarly to the QuickTime movie file. Further, the management information of the file management system is updated so as to be compatible with the recording or deletion of the index file.

In the index file production process of the system control microcomputer 19, extract information is classified for individual kinds of extract information into groups to form, for the different kids of extract information, files of a property entry, a text entry, a thumbnail picture entry, and a sound entry, which cooperate with one another to form an index file. Consequently, in the present embodiment, the index file can be utilized efficiently to detect a desired file simply, easily, and with certainty, and the operability can be improved as much.

In the index file produced in this manner, the extract information of one file or one folder is allocated to and registered in a slot of a fixed length in each of the entries such that the extract information of the one file or folder is allocated to one or a plurality of slots. Consequently, in the present embodiment, processing relating to the index file can be simplified.

When corresponding extract information is registered into the individual entries using slots of a fixed length in this manner, a property entry is formed in the index file such that it has slots corresponding to the other entries. Consequently, in any other entry of the index file than the property entry, the number of slots to be allocated to one file or folder varies depending upon the file or folder of the object of management or upon the setting of the user. In contrast, in the property entry, slots corresponding to slots of the other entries are provided without fail, and consequently, the slots of the other entries can be managed with reference to the property entry.

The property entry has slots set therein in this manner, and management information for managing the other entries is set in the slots of the property entry. The management information in each slot of the property entry includes a valid/invalid flag, which is valid/invalid information representative of whether the slot is valid or invalid, an extension slot number pointing to an extension slot succeeding to the slot, presence/absence information (a presence/absence flag) whether or not there exists a slot of a different entry corresponding to the slot, a slot number pointing to the corresponding slot of the different entry, and an extension flag representative of whether the corresponding slot of the different entry is an extension slot. Consequently, in the index file, a combination of slots to which extract information of one file or one folder is allocated can be indicated with the management information. As a result, processing relating to deletion or addition of extract information can be executed simply, easily, and with certainty with reference to the management information set in the property entry (FIGS. 2, 3A, and 3B).

In particular, where the management information is set in the property entry of the index file in this manner and, in order to delete the one file or folder, the registration of the entire corresponding extract information is to be deleted, in the present embodiment, the valid/invalid flag allocated to the management information is set to invalid and the extension slot number, presence/absence flags, and extension flags are set to empty, absence, and NO as initially set, respectively. Thus, also a slot detected by successively tracing the extension entry number set in the slot relating to the valid/invalid flag is formed as a free slot by similar settings. Consequently, in the present embodiment, extract information can be deleted simply, easily, and with certainty (FIGS. 4A and 4B).

On the other hand, when extract information in a particular entry is to be deleted, the presence/absence flag of the entry of the object of the deletion can be set to absence in a corresponding slot of the property entry and also in a slot detected by successively tracing the extension entry number set in the slot of the property entry thereby to set the slots in which the extract information of the particular entry is recorded to free slots. This can also execute processing of the index file in deletion simply, easily, and with certainty (FIGS. 7A and 7B).

Where free slots are produced by settings of the valid/invalid flag and the presence/absence flag in this manner, in the present embodiment, those slot numbers, which point to the corresponding slots of the different entries, are maintained as they are. Consequently, in the present embodiment, a combination of free slots can be grasped from the combination of slots in which extract information has been recorded. As a result, increase of free slots can be prevented effectively, and the convenience in registration of extract information can be anticipated by utilization of the combination of free slots. Further, by setting the extension slot number to empty, such a combination of free slots as described above is formed in a unit of a slot of the property entry. This can also execute processing of deletion and registration of extract information through simple and easy processing. Furthermore, even if various processes are repeated, a slot in a leak state does not appear at all.

In particular, in the present embodiment, when extract information is to be registered, the numbers of free slots of the entries necessary for the registration are detected, and a combination of corresponding free slots is detected based on management information set in the property entry. If no free slot is detected or in a like case, then free slots corresponding to the extract information to be registered are added to the individual entries, and the corresponding extract information and so forth are allocated to the added free slots. Consequently, extract information from one file or folder is registered into the index file (FIGS. 3A, 3B, 4A, and 4B).

In contrast, if a combination of free slots, which satisfies the numbers of slots necessary for the registration, is detected, then the corresponding extract information and so forth are allocated to the combination of the free slots. Consequently, the extract information from the one file or folder is registered into the index file. At this time, naturally the valid/invalid flag of the property entry is set to valid. Further, when extract information of a different entry is to be registered, the presence/absence flag in the corresponding entry is set to presence. However, since the slot numbers are maintained as those upon registration of the extract information relating to the combination of free slots, corresponding free slots of the entries can be detected with the slot numbers to register the extract information without searching for necessary free slots of the different entries again. Consequently, processing relating to registration of extract information can be simplified (FIGS. 3A, 3B, 4A, and 4B).

In contrast, where a plurality of slots are required for the property entry upon such registration of extract information as described above, that is, where the extract information itself of the property entry requires a plurality of slots, and besides where extract information for a different entry requires a plurality of slots and also the property entry requires a plurality of slots as much, free slots in the property entry are detected. Then, the extension slot numbers of the free slots are set so as to link a required number of free slots of the property entry thereby to produce a combination of a plurality of slots relating to the free slots. Further, the extract information is registered into the combination produced in this manner (FIGS. 4A, 4B, 5A, and 5B). Consequently, a combination of free slots can be managed in a unit of a slot of the property entry to register extract information simply and easily into a plurality of slots of the property entry.

Further, when also extract information of a different entry is to be registered upon the registration of the property entry, the extract information is registered into free slots of the different entry corresponding to such combination of free slots as described above and the presence/absence flags and the extension flags are set so as to match with them. Also in this process, it is possible to detect free slots of the different entry based on the extension slot numbers, which remain set in the individual slots of the property entry, and consequently, the extract information can be registered by simple and easy processing. Further, in such registration of extract information into the different entry as just described, the presence/absence flags, slot numbers, and extension flags of the property entry are set so as to successively point to a slot beginning with the corresponding top slot of the property entry. Consequently, even where deletion or/and addition are repeated, thumbnail picture data and so forth can be searched out through a simple and easy process.

In contrast, where a plurality of slots are required for the property entry, if the property entry and/or the different entry are short of free slots, free slots are added to the tail end of that entry, which is short of slots, and the management information of the slots of the property entry is set so as to add the added free slots to the combination of free slots (FIGS. 4A, 4B, 6A, and 6B). In the combination of free slots with the free slots added in this manner, the valid/invalid flags are set to valid and corresponding extract information and so forth are allocated to the slots. Consequently, the extract information from the one file or folder is registered into the index file.

Also in this instance, since, in the combination of the original free slots, the slot numbers relating to the combination of free slots are maintained as those upon registration, the settings of the slot numbers can be utilized effectively to register the extract information. Consequently, processing relating to registration of extract information can be simplified.

1-5. Advantages of the First Embodiment

With the optical disk apparatus having the configuration described above, each slot of the property entry records, as management information representative of whether the slot is valid or invalid and indicative of a relationship to other slots to which extract information relating to the same file is allocated, an extension slot number, presence/absence flags, slot numbers, and extension flags. The combination of slots in which the extract information is recorded is managed with the property entry. Consequently, where an index file is formed from groups of data wherein extract information is collected for different types and one of the groups of data is used to collectively manage the other groups of data, a process relating to deletion or addition of extract information can be executed simply, easily, and with certainty.

In particular, by setting a free slot by setting of the valid/invalid information without changing the slot numbers from among the management information items, processing relating to deletion of extract information can be executed simply, easily, and with certainty. Further, a combination of free slots can be formed by a combination of slots set upon registration of extract information. Consequently, the free slots can be re-utilized based on the combination of free slots to execute processing relating to registration of extract information simply, easily, and with certainty.

Further, by changing only the presence/absence flag relating to a different entry without changing the slot numbers at all to delete corresponding extract information of the property entry to set a free slot, only desired extract information can be deleted simply and easily. Further, a combination of slots in which the extract information is registered can be formed from the combination of slots set upon registration of the extract information. Consequently, the combination of slots can be utilized for registration of extract information to execute processing relating to registration of extract information simply, easily, and with certainty.

Further, by detecting such a combination of free slots as described above with reference to the valid/invalid flag and so forth and registering extract information into the combination, the extract information can be registered simply, easily, and with certainty.

Further, where slots are insufficient, a free slot or slots are added to the entry, which exhibits the shortage, and a combination of free slots is formed together with the added free slots and extract information is registered into the combination. This can also register extract information simply, easily, and with certainty.

Further, where a plurality of slots are required for registration of extract information in the property entry, also if the extension slot number is set so as to point to a slot of the property entry, which relates to another combination of free slots, and a plurality of combinations of free slots are collected into one combination and then the extract information is registered into the collective combination of free slots, the extract information can be registered simply, easily, and with certainty.

Furthermore, in this instance, where slots are insufficient, also if a free slot or slots are added to the entry, which exhibits the shortage, and a combination of free slots is formed together with the added free slots and then extract information is registered into the combination, the extract information can be registered simply, easily, and with certainty.

2. Second Embodiment

In the present embodiment, when free slots corresponding to shortage are to be added to a corresponding entry, a predetermined number of slots are added collectively. It is to be noted that the present embodiment is configured similarly to the first embodiment except that it is different in a process relating to such addition of slots.

Figure 12:
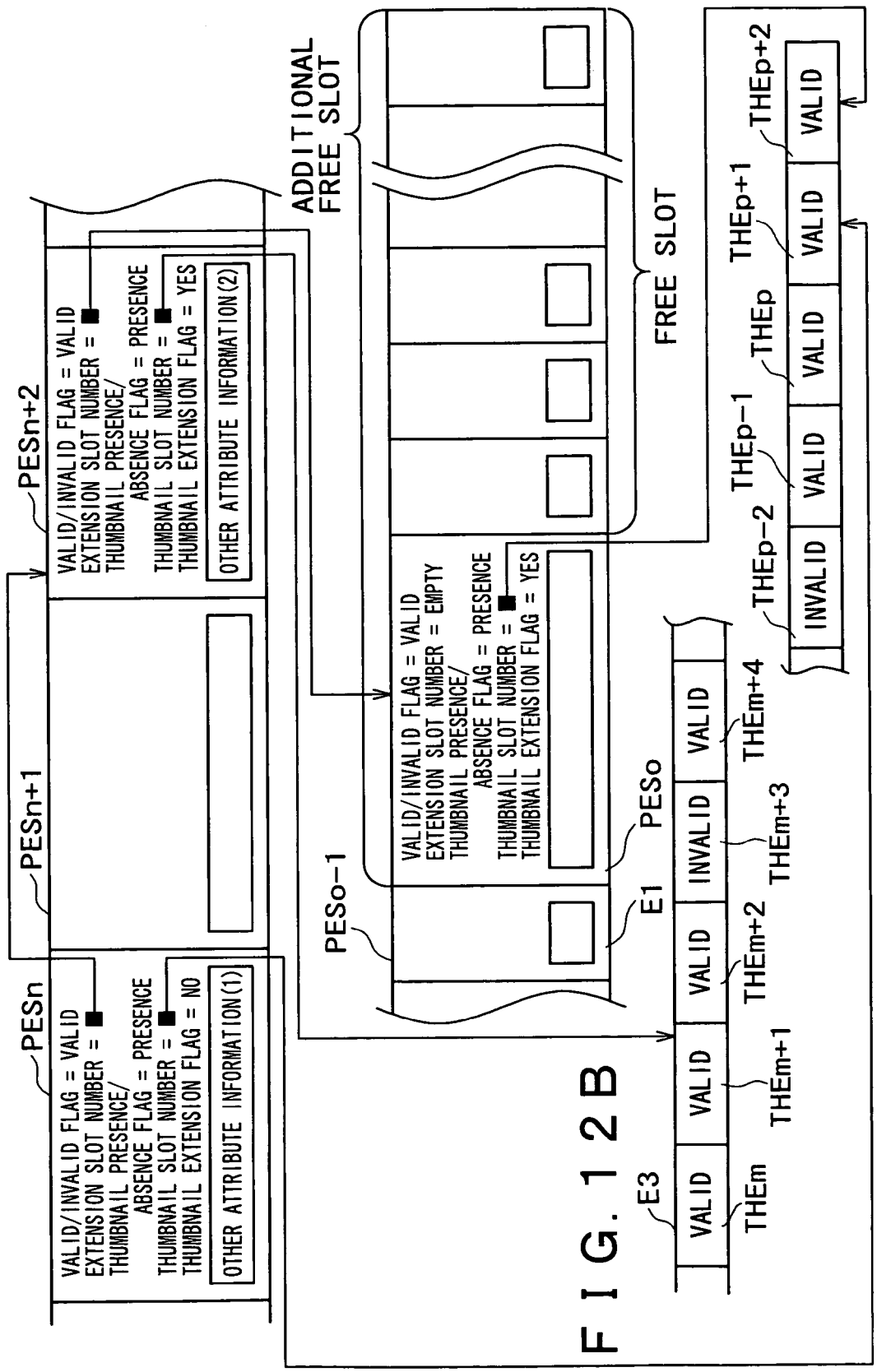
FIGS. 12A and 12B are diagrammatic views illustrating registration of extract information where a free slot is re-utilized according to a second embodiment of the present invention.

In particular, as seen in FIGS. 12A and 12B, in the present embodiment, when free slots are insufficient, a predetermined number of free slots are set collectively at the tail end of a corresponding entry. It is to be noted that, in the example of FIGS. 12A and 12B, a predetermined number of free slots are added to the property entry and only one of the added free slots is used for registration of extract information.

Figure 13:
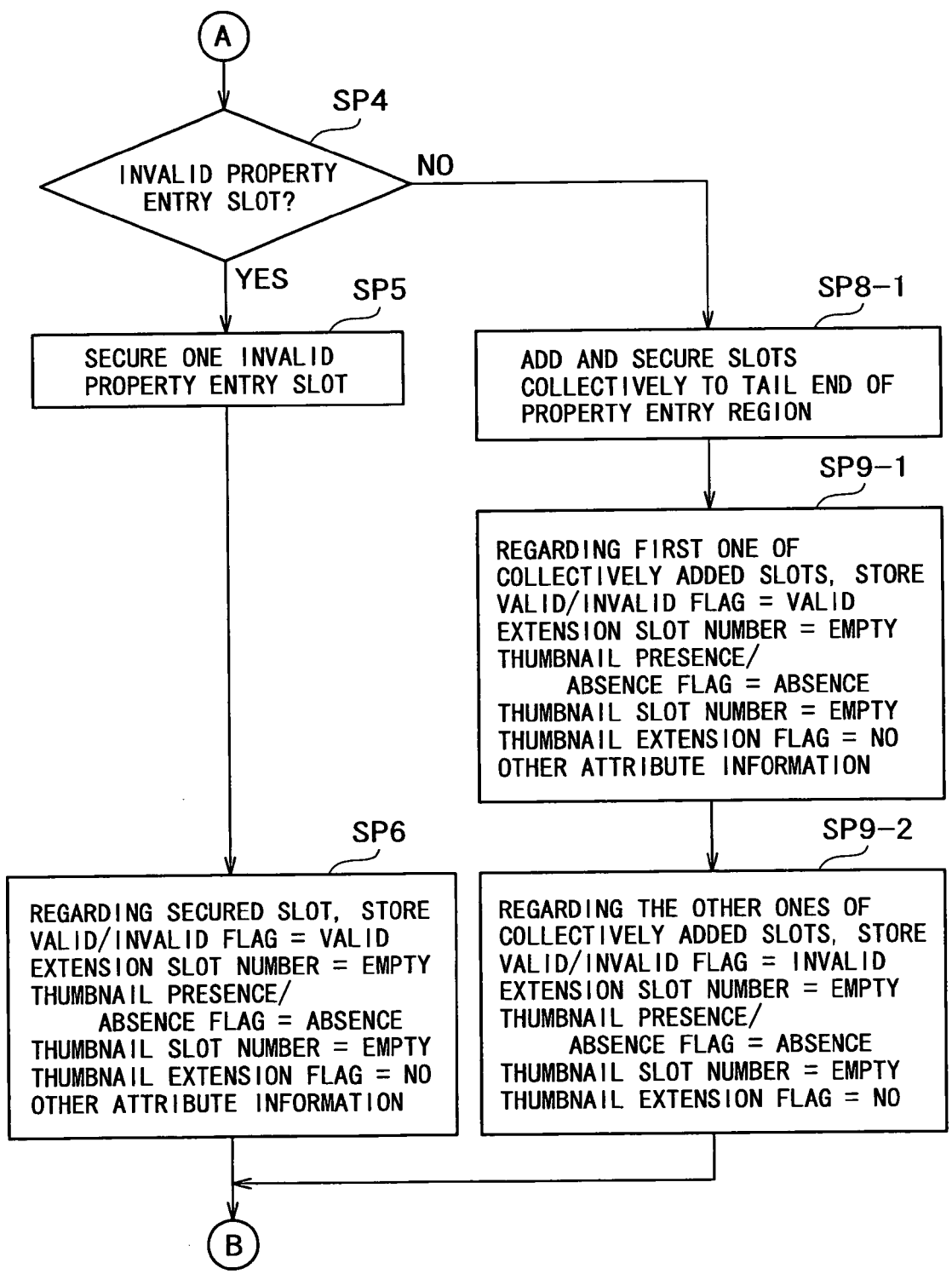
FIG. 13 is a flow chart illustrating a processing procedure when the registration illustrated in FIGS. 12A and 12B is performed.

Therefore, the system control microcomputer 19 in the present embodiment executes, for the example illustrated in FIGS. 12A and 12B, a processing procedure of steps SP8-1, SP9-1, and SP9-2 illustrated in FIG. 13 in place of the process at step SP8 described hereinabove with reference to FIGS. 8 and 9. In the description of FIG. 13, the procedures, which are the same as described in FIGS. 8 and 9, have same numerals.

Referring to FIG. 13, the system control microcomputer 19 advances the processing from step SP3 (FIG. 8) to step SP4, at which it discriminates whether or not a free slot is present in the property entry. If an affirmative result is obtained, then the system control microcomputer 19 successively executes the processes at steps SP5 and SP6 similarly as in the processing procedure in the first embodiment and advances the processing to step SP7 thereby to register the extract information into the free slot detected in the property entry.

On the other hand, if no free slot is present at step SP4, then a negative result is obtained at step SP4, and in this instance, the system control microcomputer 19 advances the processing to step SP8-1. At step SP8-1, the system control microcomputer 19 adds a predetermined number of slots to the tail end of the property entry. Then at step SP9-1, the system control microcomputer 19 registers corresponding extract information into the slot added directly to the tail end of the property entry and sets management information of the slot. Further at step SP9-2, the remaining added slots are set as free slots. Thereafter, the processing advances to step SP7.

Where free slots are added collectively in this manner, there is no necessity to register a free slot every time shortage of a slot occurs. Consequently, similar advantages to those of the first embodiment can be achieved while the processing can be simplified as much.

3. Third Embodiment

In the present embodiment, from a combination of slots including a slot set as a free slot by the setting of the presence/absence flag, the free slot is removed and allocated to a combination of free slots, which is short of slots, thereby to prevent appearance of a free slot with a higher degree of certainty. It is to be noted that the present embodiment is configured similarly to the first embodiment except that it is different in processing of a free slot relating to the setting of the presence/absence flag.

Figure 14:
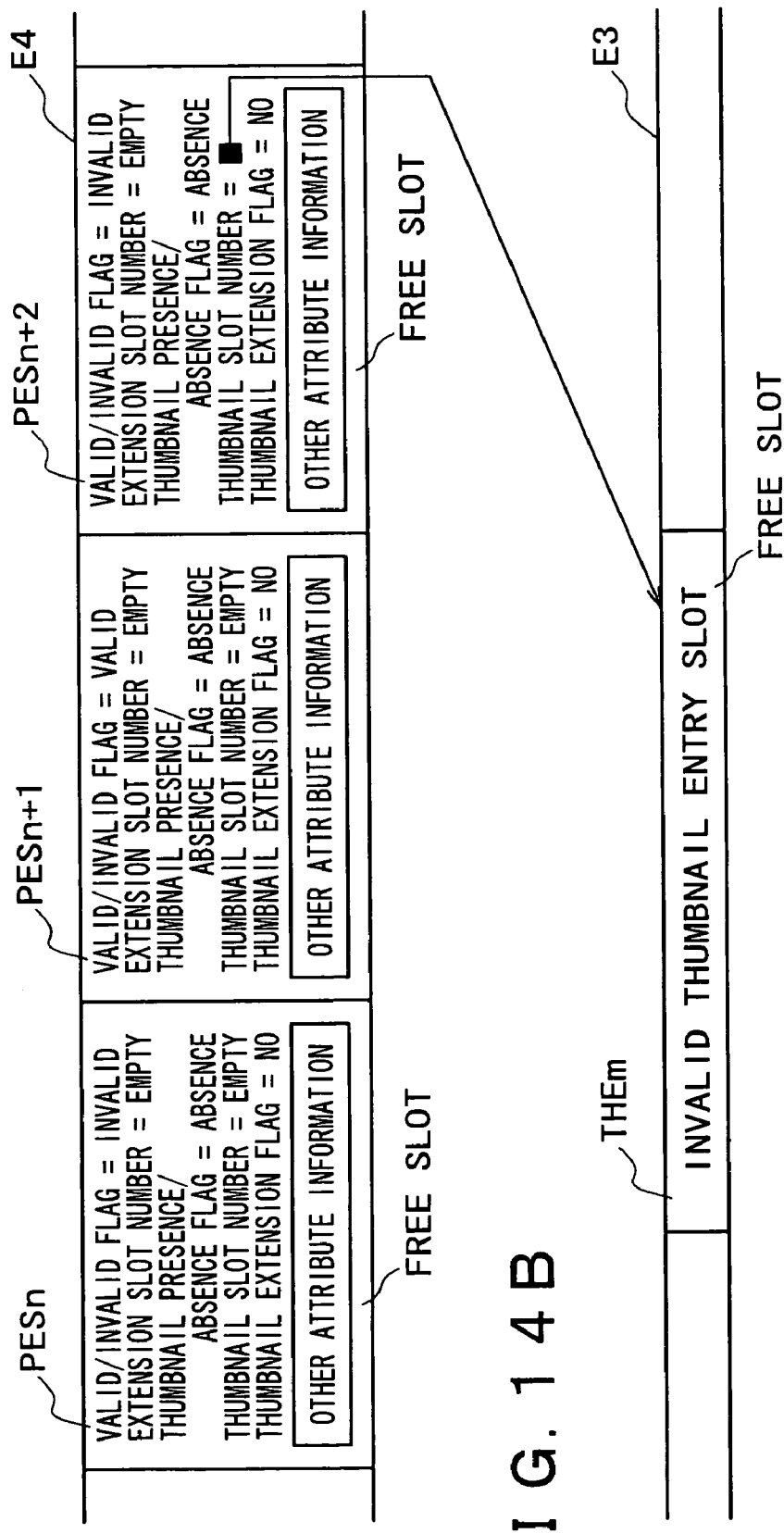
FIGS. 14A and 14B are diagrammatic views illustrating registration of extract information where a free slot is re-utilized according to a third embodiment of the present invention.

In particular, for example, where each of the property entry and the thumbnail picture entry is short of one slot for registration of extract information as seen in FIGS. 14A and 14B, with respect to the slot PESn, the thumbnail picture entry is short of a free slot. In contrast, the slot PESn+1 has a free slot of the thumbnail picture entry.

Figure 15:
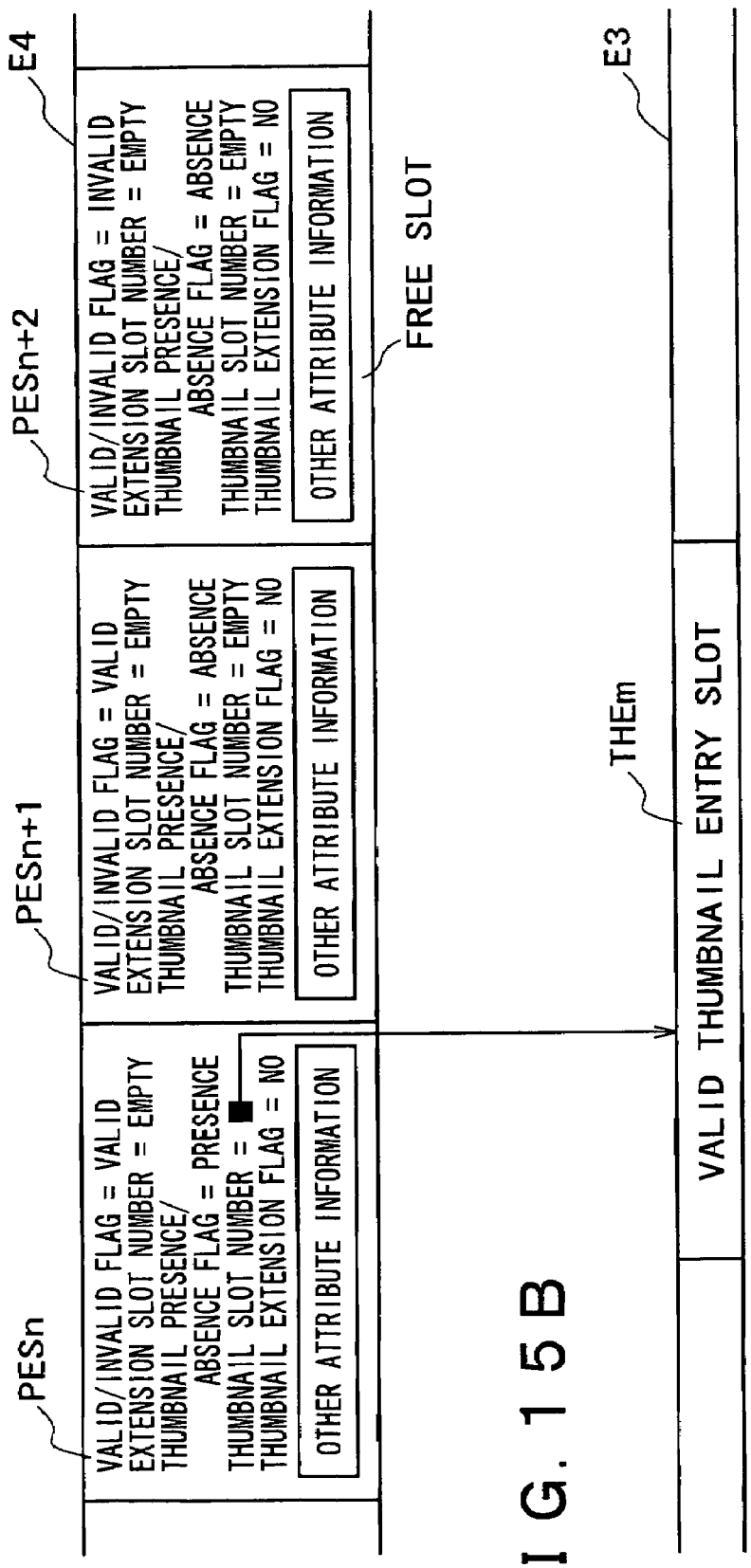
FIGS. 15A and 15B are diagrammatic views illustrating a process executed next to the process illustrated in FIGS. 14A and 14B.

In such an instance, the system control microcomputer 19 detects the slot PESn+2 of the property entry E4 wherein the presence/absence flag is set to absence and the extension slot number is set to a significant value with regard to an insufficient slot. As seen from FIGS. 15A and 15B in contrast with FIGS. 14A and 14B, when the slot PESn+2 set in this manner is detected, the system control microcomputer 19 sets the thumbnail slot number of the slot PESn+2 to empty so as not to point to the free slot THEm thereby to remove the free slot THEm from within the combination of the slot PESn+2 to which the free slot THEm has belonged till then.

Further, the system control microcomputer 19 sets the slot number in the free slot PESn of the property entry into which the extract information is to be registered so as to point to the slot THEm removed as described above and sets the presence/absence flag to presence thereby to add the removed free slot THEm to the combination of the free slot PESn of the object of registration of the extract information. Further, the system control microcomputer 19 registers the extract information into the combination of the free slot PESn to which the free slot THEm is added in this manner.

Figure 16:
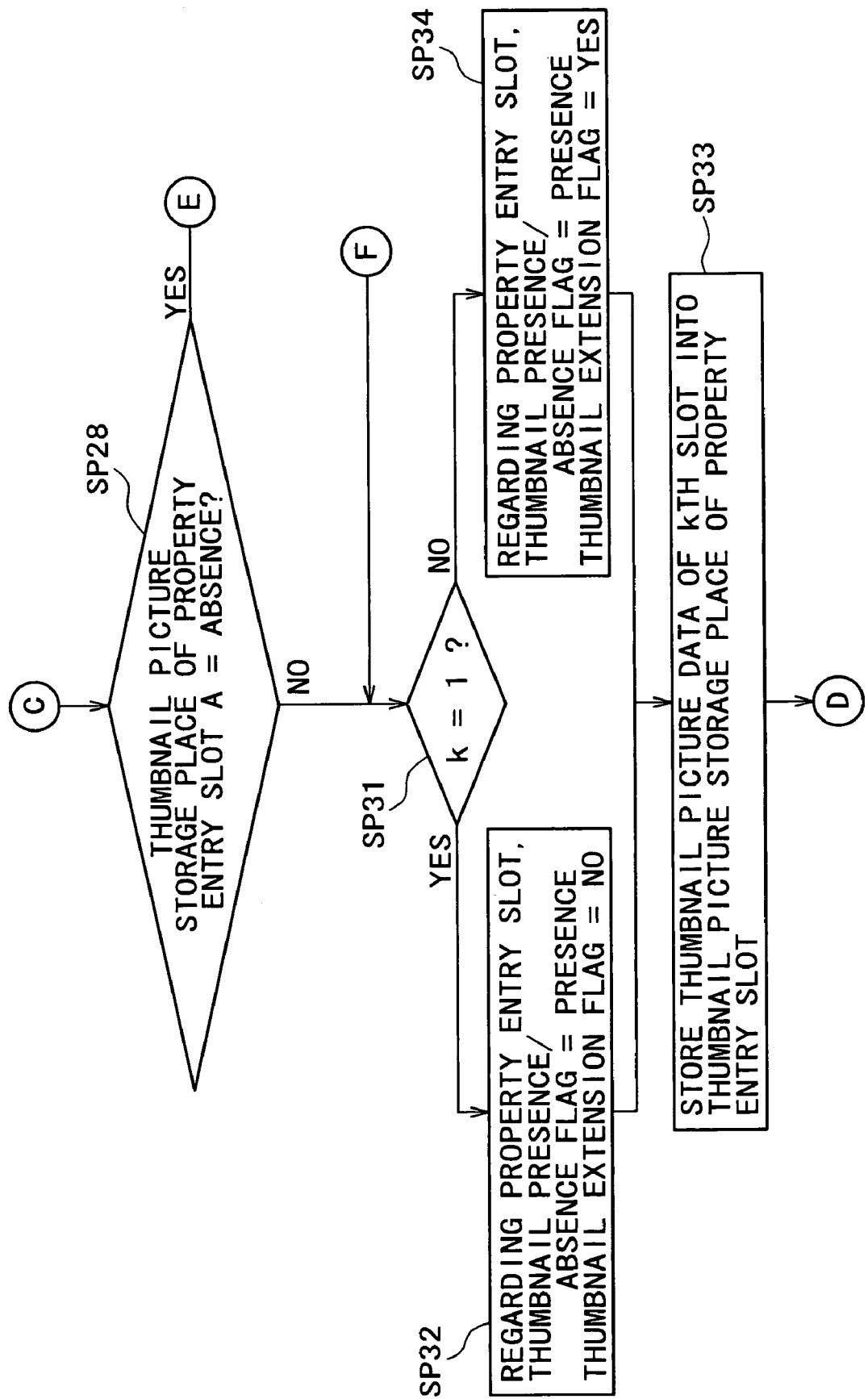
FIGS. 16 and 17 are flow charts illustrating a processing procedure when the process illustrated in FIGS. 15A and 15B is performed.
Figure 17:
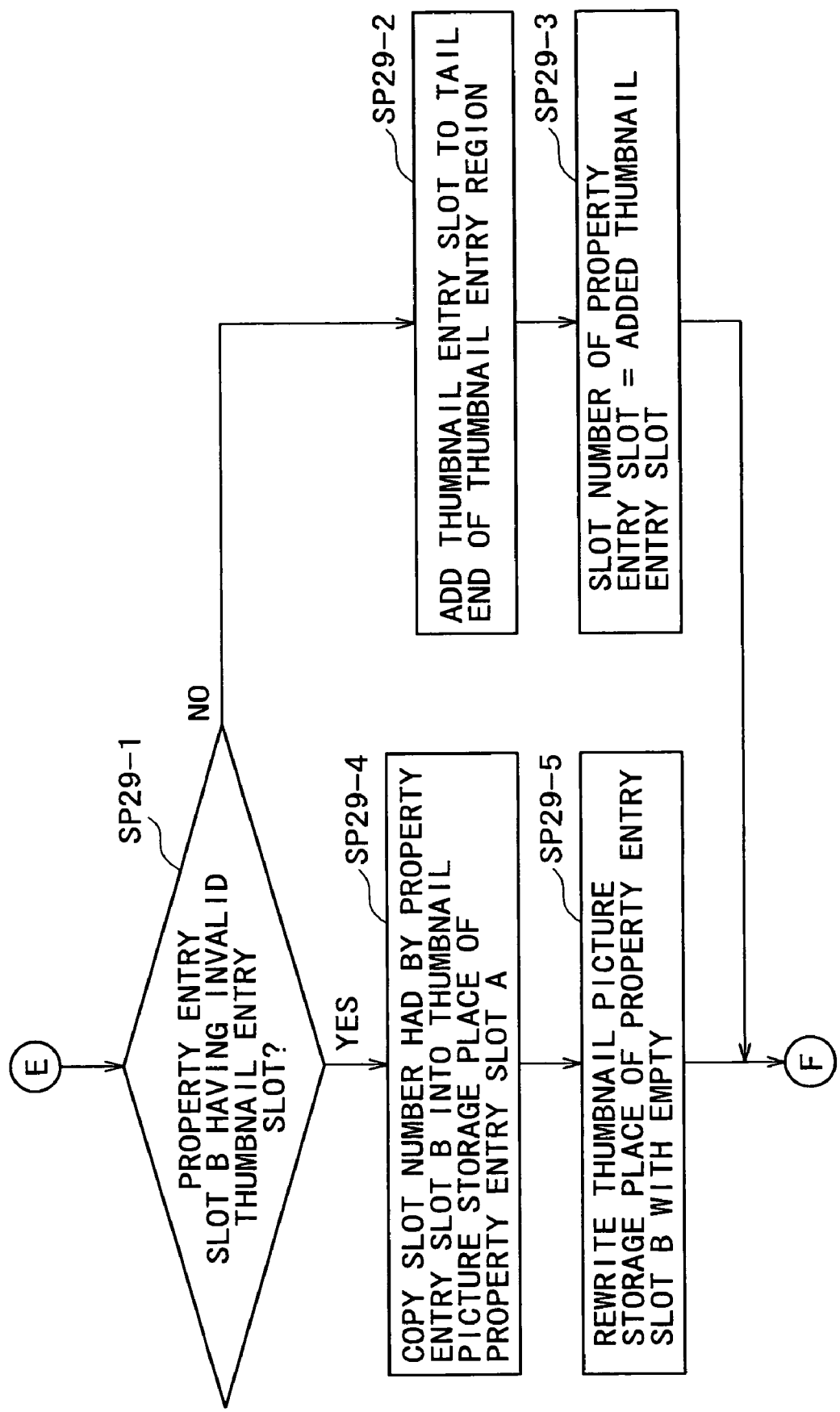

Therefore, the system control microcomputer 19 in the present embodiment executes a processing procedure at steps SP29-1 to SP29-5 illustrated in FIGS. 16 and 17 in place of the processes at steps SP29 and SP30 described hereinabove with reference to FIGS. 10 and 11. In the description of FIGS. 16 and 17, the procedures, which are the same as described in FIGS. 10 and 11, have same numerals, and overlapped description thereof is omitted.

Referring to FIGS. 16 and 17, if an affirmative result is obtained at step SP27 illustrated in FIG. 10, then the system control microcomputer 19 advances the processing from step SP27 to step SP28. At step SP28, the system control microcomputer 19 discriminates whether or not the presence/absence flag representative of presence of a corresponding thumbnail slot is set to absence in the slot of the property entry, which is an object of registration of the extract information. If a negative result is obtained, then the system control microcomputer 19 advances the processing from step SP28 to step SP31. Then, the system control microcomputer 19 executes the processes at step SP32 and SP33 or executes the process at step SP34, and thereafter advances the processing to step SP35 (FIG. 10).

In contrast, if an affirmative result is obtained at step SP28, then since a slot is not present in the thumbnail picture entry, the processing advances to step SP29-1. At step SP29-1, the system control microcomputer 19 discriminates whether or not a slot of the property entry wherein the presence/absence flag is set to absence and the slot number is set to a significant value is present. If a negative result is obtained, then the system control microcomputer 19 advances from step SP29-1 to step SP29-2, at which it adds a free slot to the tail end of the thumbnail picture entry. Then at next step SP29-3, the system control microcomputer 19 sets the slot number to the free slot of the property entry relating to the process at step SP28 so as to point to the free slot added at step SP29-2. Thereafter, the processing advances to step SP31.

On the other hand, if an affirmative result is obtained at step SP29-1, then the system control microcomputer 19 advances the processing from step SP29-1 to step SP29-4, at which it copies the slot number relating to the free slot detected at step SP29-1 and sets the slot number to the free slot of the property entry of the object of processing. Further, at next step SP29-5, the system control microcomputer 19 sets the slot number relating to the free slot detected at step SP29-1 to empty. Thereafter, the processing advances to step SP31.

In the present third embodiment, a slot number is set in a free slot into which extract information is to be registered so as to point to a free slot of a different combination of slots and the presence/absence flag is set so as to match with the setting of the slot number to move the short free slot from the different combination of slots to the combination of free slots and register the extract information into the thus moved free slot. Consequently, similar advantages to those of the first embodiment can be achieved while appearance of a free slot can be further reduced in comparison with the first and second embodiments.

4. OTHER EMBODIMENTS

It is to be noted that, while, in the embodiments described hereinabove, an index file is formed from entries each in the form of a file, the present invention is not limited to this but can be applied widely also where each entry is formed as an internal file to form an index file.

Further, while, in the embodiments described hereinabove, the present invention is applied to an optical disk apparatus to record an image pickup result, an output of a personal computer, and so forth, the present invention is not limited to this but can be applied widely also where a large number of files recorded on various recording media such as a magneto-optical disk and a hard disk apparatus are managed or where a large number of files stored in a predetermined server are managed.

Further, while, in the embodiments described hereinabove, a management object file in the form of a QuickTime movie file is managed, the present invention is not limited to this but can be applied widely also where files of video data, files of audio data, and so forth of various formats are managed.

Further, while, in the embodiments described hereinabove, an index file is recorded together with a management object file, the present invention is not limited to this but can be applied widely also where an index file is recorded on a recording medium different from that on which a management file is recorded, where an index file is stored in a server different from that in which a management file is stored, and so forth.

Further, while, in the embodiments described hereinabove, a series of processes is executed in accordance with a processing program installed in advance in the system control microcomputer 19, the present invention is not limited to this but can be applied widely also where such a program as just described is provided in the form of a recording medium or through a network such as the Internet and a series of processes is executed in accordance with the program. It is to be noted that, as such a recording medium as just described, various recording media such as an optical disk and a magnetic tape can be applied widely.

While preferred embodiments of the present invention have been described using specific terms, such description is for illustrative purpose only, and it is to be understood that changes and variations may be made without departing from the spirit or scope of the following claims.

What is claimed is:

1. A recording apparatus for recording desired files on a recording medium, the recording apparatus comprising:
   index file production means for producing an index file of the flies recorded on the recording medium from extract information of the files and a folder;
   said index file production means being operable to classify the extract information for individual types of the extract information into groups including a group of property to which property information of the files is allocated and a different group different from the group of property, to allocate, in the different group of the extract information, the extract information of one of the files or the folder to one or a plurality of slots of a fixed length, and to allocate, in the group of property, the extract information of the one file or the folder to one or a plurality of slots of the fixed length so that said group of property has at least slots corresponding to the slots of the different group to produce the index file;
   said index file production means setting, in the slots of the group of property, management information for managing the groups;
   said index file production means setting, in the management information of each of the slots of the group of property, valid/invalid information representative of whether the slot is valid or invalid, an extension slot number pointing to an extension slot succeeding the slot, presence/absence information representative of whether a corresponding slot of the different group to which the extract information of the file relating to the slot is allocated is present or absent, a slot number pointing to the corresponding slot of the different group, and extension information representative of whether or not the corresponding slot of the different group is an extension slot;
   a combination of the slots to which the extract information of the one file or the folder is allocated with the extension slot number, presence/absence information, slot number, and extension information being indicated by the group of property.

2. The recording apparatus according to claim 1, wherein, when the extract information of all of the groups relating to a predetermined one of the files or the folder is to be deleted, in the slot or each of the slots of the group of property, which has or have the extract information, the slot number, which points to the corresponding slot of the different group, is maintained without being changed while the valid/invalid information is set to invalid and the extension slot number, presence/absence information, and extension information are cleared thereby to set all of the slots to which the extract information of the file or the folder is allocated as free slots.

3. The recording apparatus according to claim 1, wherein, when the extract information of the different group relating to a predetermined one of the files or the folder is to be deleted, in the slot or each of the slots of the group of property, which has or have the property information of the extract information, the valid/invalid information, extension slot number, and slot number are maintained without being changed while the presence/absence information is set to absence and the extension information is cleared thereby to set the corresponding slot of the different group as a free slot.

4. The recording apparatus according to claim 2, wherein said index file production means detects a free slot of the group of property with reference to the valid/invalid information, detects a combination of free slots to which the extract information of the predetermined file or the folder was allocated in the past with reference to the slot number set in the detected free slot, and registers the extract information into the detected combination of free slots.

5. The recording apparatus according to claim 4, wherein, where the detected combination of free slots gives rises to shortage of a slot, said index file production means adds, when the group with regard to which the shortage of a slot occurs is the group of property, a free slot based on setting of the valid/invalid information, but adds, when the group with regard to which the shortage of a slot occurs is the different group, a free slot to the group, and sets the slot number of the added slot tote slot number in the free slot of the group of property, which points to the corresponding slot of the different group, adds the added slot to the combination of detected free slots, and registers the extract information into the resulting combination of free slots.

6. The recording apparatus according to claim 5, wherein said index file production means executes, upon addition of a free slot, collective addition of a predetermined plural number of free slots, adds a number of slots equal to the number of slots corresponding to the shortage from among the added free slots to the combination of detected free slots, and registers the extract information into the resulting combination of free slots.

7. The recording apparatus according to claim 2, wherein, where a plurality of slots are required for the group of property in order to register the extract information, said index file production means detects a number of free slots required for the group of property with reference to the valid/invalid information, successively sets the extension slot number of each of the free slots so as to point from each one of the free slots to a different one of the free slots thereby to set a combination of free slots relating to the one free slot and another combination of free slots relating to the different free slot to one combination of free slots, and registers the extract information into the one combination of free slots.

8. The recording apparatus according to claim 4, where the detected combination of free slots gives rises to shortage of a slot in the different group, said index file production means sets the slot number in the detected combination of free slots so as to point to a free slot of the corresponding group, which is set as a free slot in a different combination of slots and sets the presence/absence information so as to match with the setting of the slot number thereby to add the free slot of the corresponding group in the different combination of slots to the detected combination of free slots, sets a null value to the slot number in the different combination of slots so as not to point to the slot set as a free slot in the different combination of slots thereby to remove the slot set as a free slot from the different combination of slots, and registers the extract information into the detected combination of free slots.

* * * * *